US009216826B2

(12) United States Patent
Orson et al.

(10) Patent No.: US 9,216,826 B2
(45) Date of Patent: *Dec. 22, 2015

(54) AIRCRAFT SEATING CONFIGURATION

(71) Applicant: Zodiac Seat Shells US LLC, Santa Maria, CA (US)

(72) Inventors: Ben Orson, Kent (GB); Zhao Jin, Everett, WA (US)

(73) Assignee: Zodiac Seat Shells U.S. LLC, Santa Maria, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/577,343

(22) Filed: Dec. 19, 2014

(65) Prior Publication Data
US 2015/0136905 A1 May 21, 2015

Related U.S. Application Data

(63) Continuation of application No. 13/662,225, filed on Oct. 26, 2012, now Pat. No. 8,944,379.

(60) Provisional application No. 61/553,034, filed on Oct. 28, 2011.

(51) Int. Cl.
*B64D 11/06* (2006.01)

(52) U.S. Cl.
CPC ............ *B64D 11/0601* (2014.12); *B64D 11/06* (2013.01); *B64D 11/0606* (2014.12); *B64D 11/0638* (2014.12); *B64D 11/0641* (2014.12)

(58) Field of Classification Search
CPC ...... B60N 2/24; B64D 11/06; B64D 11/0601; B64D 11/0641; B64D 11/0638; B64D 11/0606

USPC .............. 244/118.5, 118.6; 297/63, 118, 232, 297/248, 257; 105/344
See application file for complete search history.

(56) References Cited

U.S. PATENT DOCUMENTS 7,472,957 B2  1/2009  Ferry et al.
7,523,888 B2  4/2009  Ferry et al.
(Continued)

FOREIGN PATENT DOCUMENTS

DE     102006056898 A1   6/2008
EP          2154067 A2    2/2010
(Continued)

OTHER PUBLICATIONS

PCT/US2012/062474, International Search Report and Written Opinion dated Feb. 8, 2013.
(Continued)

*Primary Examiner* — Elizabeth A Plummer
(74) *Attorney, Agent, or Firm* — Kilpatrick Townsend & Stockton LLP; Dean W. Russell; Tiffany L. Williams

(57) ABSTRACT

A passenger seating arrangement for an aircraft cabin that includes first and second adjacent columns of at least two seats that define a first longitudinally extending center axis that extends approximately parallel to a longitudinal axis of the aircraft cabin. The seats in the first column face away from and form an angle with the first axis of between about 1° and about 44°, and the seats in the second column face away from and form an angle with the first axis of between about 1° and about 44°. Each seat in the first column is staggered fore of a seat in the second column.

20 Claims, 20 Drawing Sheets

(56) References Cited

U.S. PATENT DOCUMENTS

| | | |
|---|---|---|
| 7,578,470 B2 | 8/2009 | Plant |
| 7,780,115 B2 | 8/2010 | Watanabe |
| D653,883 S | 2/2012 | Ferry et al. |
| 8,196,864 B2 | 6/2012 | Ruiter et al. |
| 8,245,970 B2 | 8/2012 | Harcup |
| 8,474,757 B2 | 7/2013 | Harcup |
| 8,573,537 B2 | 11/2013 | Bock |
| D696,034 S | 12/2013 | Ersan et al. |
| 2002/0017810 A1 | 2/2002 | Dryburgh et al. |
| 2006/0097553 A1 | 5/2006 | Spurlock et al. |
| 2009/0146004 A1 | 6/2009 | Plant |
| 2010/0252680 A1 | 10/2010 | Porter |
| 2011/0101161 A1 | 5/2011 | Saint-Jalmes et al. |
| 2011/0186682 A1 | 8/2011 | Collins et al. |
| 2012/0146372 A1 | 6/2012 | Ferry |
| 2013/0032668 A1 | 2/2013 | Foucher et al. |
| 2013/0068887 A1 | 3/2013 | Ko |
| 2013/0106156 A1 | 5/2013 | Orson et al. |

FOREIGN PATENT DOCUMENTS

| | | |
|---|---|---|
| FR | 2935684 A1 | 3/2010 |
| WO | 2010100500 A2 | 9/2010 |
| WO | 2013063599 A1 | 5/2013 |

OTHER PUBLICATIONS

PCT/US2012/062474, International Preliminary Report on Patentability dated May 8, 2014.
U.S. Appl. No. 13/662,225, Non-Final Office Action dated Feb. 27, 2014.
U.S. Appl. No. 13/662,225, Response to Non-Final Office Action dated Aug. 4, 2014.
U.S. Appl. No. 13/662,225, Notice of Allowance dated Sep. 19, 2014.
Europe Patent Application No. 12843565.8, Extended European Search Report dated Jun. 18, 2015.

AIRCRAFT SEATING CONFIGURATION

CROSS REFERENCE TO RELATED APPLICATIONS

This application is a continuation of U.S. patent application Ser. No. 13/662,225, filed on Oct. 26, 2012, now allowed, which is related to and claims the benefit of U.S. Provisional Application Ser. No. 61/553,034, filed on Oct. 28, 2011, which are herein incorporated by reference in their entireties.

FIELD OF THE INVENTION

The present invention relates to aircraft passenger seating, and more particularly to an aircraft seating configuration that includes longitudinally staggered and angled seating.

BACKGROUND OF THE INVENTION

First/business class cabins in many aircraft provide various forms of seats that allow passengers to recline to a comfortable position for resting or sleeping. Some seats recline all the way to a horizontal position. However, one of the drawbacks of the increased recline of seats is the decreased number of seats that can be included in an aircraft. Therefore, airlines must balance passenger comfort with the number of seats (and the fares that can be collected). Accordingly, a need exists for a seating configuration that maximizes seat density while providing passenger comfort.

SUMMARY OF THE PREFERRED EMBODIMENTS

In accordance with a first aspect of the present invention there is provided a seating assembly adapted to be positioned in an aircraft cabin that includes a first seat having a first seat back and a first seat bottom and defining a first longitudinal axis, and a second seat having a second seat back and a second seat bottom and defining a second longitudinal axis. The first and second seats are positioned adjacent to one another. The seating assembly includes a third longitudinal axis that is approximately parallel with a longitudinal axis defined by the aircraft cabin when the seating assembly is positioned in an aircraft cabin. The first seat faces fore and is positioned such that the first longitudinal axis forms an angle with the third longitudinal axis that is between about 1° and about 44° and the second seat faces fore and is positioned such that the second longitudinal axis forms an angle with the third longitudinal axis that is between about 1° and about 44°. The first and second seats face away from each other and away from the third longitudinal axis. In a preferred embodiment, the first and second seats are not separated by an aisle and the first seat is positioned fore of the second seat. In a preferred embodiment, the first and second seats are at least partially surrounded by first and second privacy shells, respectively. The first and second privacy shells each include a console portion with an exterior surface and an interior surface. The first console portion includes at least one passenger component associated with the exterior surface thereof, and the second console portion includes at least one passenger component associated with the exterior surface thereof. The at least one passenger component of the first console portion is adapted to be used by a passenger positioned in the second seat, and the at least one passenger component of the second console portion is adapted to be used by a passenger positioned in a third seat. Preferably, the first privacy shell and the second privacy shell each include a monitor positioned in a back surface thereof.

In a preferred embodiment, the first console portion includes a first passenger component associated with the exterior surface thereof for use by a passenger seated in the second privacy shell, the second console portion includes a first passenger component associated with the exterior surface thereof for use by a passenger seated in a third privacy shell, the first console portion includes a second passenger component associated with the interior surface thereof for use by a passenger seated within the first privacy shell, and the second console portion includes at least one passenger component associated with the interior surface thereof for use by a passenger seated in the second privacy shell.

In accordance with another preferred embodiment of the present invention, there is provided a seating assembly adapted to be positioned in an aircraft cabin that includes a first seat having a first seat back and a first seat bottom that is at least partially surrounded by a first privacy shell, and a second seat having a second seat back and a second seat bottom that is at least partially surrounded by a second privacy shell. The first privacy shell and the second privacy shell are integral with one another and at least a portion of the first seat is positioned fore of the second seat. Preferably, the first privacy shell includes a first console portion having an exterior surface and an interior surface and the second privacy shell includes a second console portion having an exterior surface and an interior surface, and the first and second console portions each include at least one passenger component associated with the exterior surface thereof. In a preferred embodiment, the at least one passenger component of the first console portion is adapted to be used by a passenger positioned in the second seat and the at least one passenger component of the second console portion is adapted to be used by a passenger positioned in a third seat.

In accordance with another aspect of the present invention, there is provided a passenger seating arrangement for an aircraft cabin that includes first and second adjacent columns of at least two seats that define a first longitudinally extending center axis that extends approximately parallel to a longitudinal axis of the aircraft cabin. The seats in the first column face away from and form an angle with the first axis of between about 1° and about 44°, and the seats in the second column face away from and form an angle with the first axis of between about 1° and about 44°. Each seat in the first column is staggered fore of a seat in the second column. In a preferred embodiment, each seat includes a privacy shell that includes at least one passenger component. The at least one passenger component of each privacy shell in the first column is adapted to be used by a passenger in a seat in the second column, and the at least one passenger component of each privacy shell in the second column is adapted to be used by a passenger in a seat in the first column. Preferably, a plurality of the privacy shells include a monitor positioned in a back surface thereof, wherein the monitor of each privacy shell in the first column is adapted to be used by a passenger seated aft in the first column, and wherein the monitor of each privacy shell in the second column is adapted to be used by a passenger seated aft in the second column.

In a preferred embodiment, the present invention provides a full flat seat/bed at a competing density as an angled flat seat design. The design addresses an arrangement of seats disposed in a particular staggered and angled configuration with each adjacent seat staggered between about 28" and about 41" longitudinally and angled away from each other laterally at about 13°, with each seat at an offset angle of about 6.5° in relation to the longitudinal axis of the cabin. Longitudinally adjacent seats overlap one another. The aftmost portion of one seat will be further aft than the foremost portion of the seat behind it.

Preferably, the seats can recline into beds and are arranged in either a 2-3-2 or a 2-4-2 arrangement across the aircraft depending on aircraft width and are arranged in longitudinally staggered pairs of columns (columns being aligned along the cabin of the aircraft). When an aisle passenger has his/her seat in the upright position, a passenger in the window or center can step unhindered from their seat through their neighbor's space to get to the aisle. If the aisle passenger has their seat deployed into a bed then the window or center passenger can access the aisle by stepping over their neighbor's legs.

Each seat has a stationary shell positioned in partial surrounding relation to the passenger providing certain privacy and amenity. In a preferred embodiment, the privacy shell also provides the adjacent seat passenger a table, seat controller, a recessed space to accommodate the feet and lower legs for the passenger behind when in the bed or lie-flat position, and a TV screen in the privacy shell for a passenger seated behind.

In a preferred embodiment, the headrest is designed to be asymmetrical to maximize the overall usable cushion area despite the intrusion of the adjacent passenger's footspace when in the bed position. However, this is not a limitation on the present invention and the headrests can be symmetrical. Each passenger's tray table is located on the console portion of the privacy shell of the seat located forward thereof.

The invention, together with additional features and advantages thereof, may be best understood by reference to the following description.

DETAILED DESCRIPTION OF THE PREFERRED EMBODIMENTS

Figure 1:
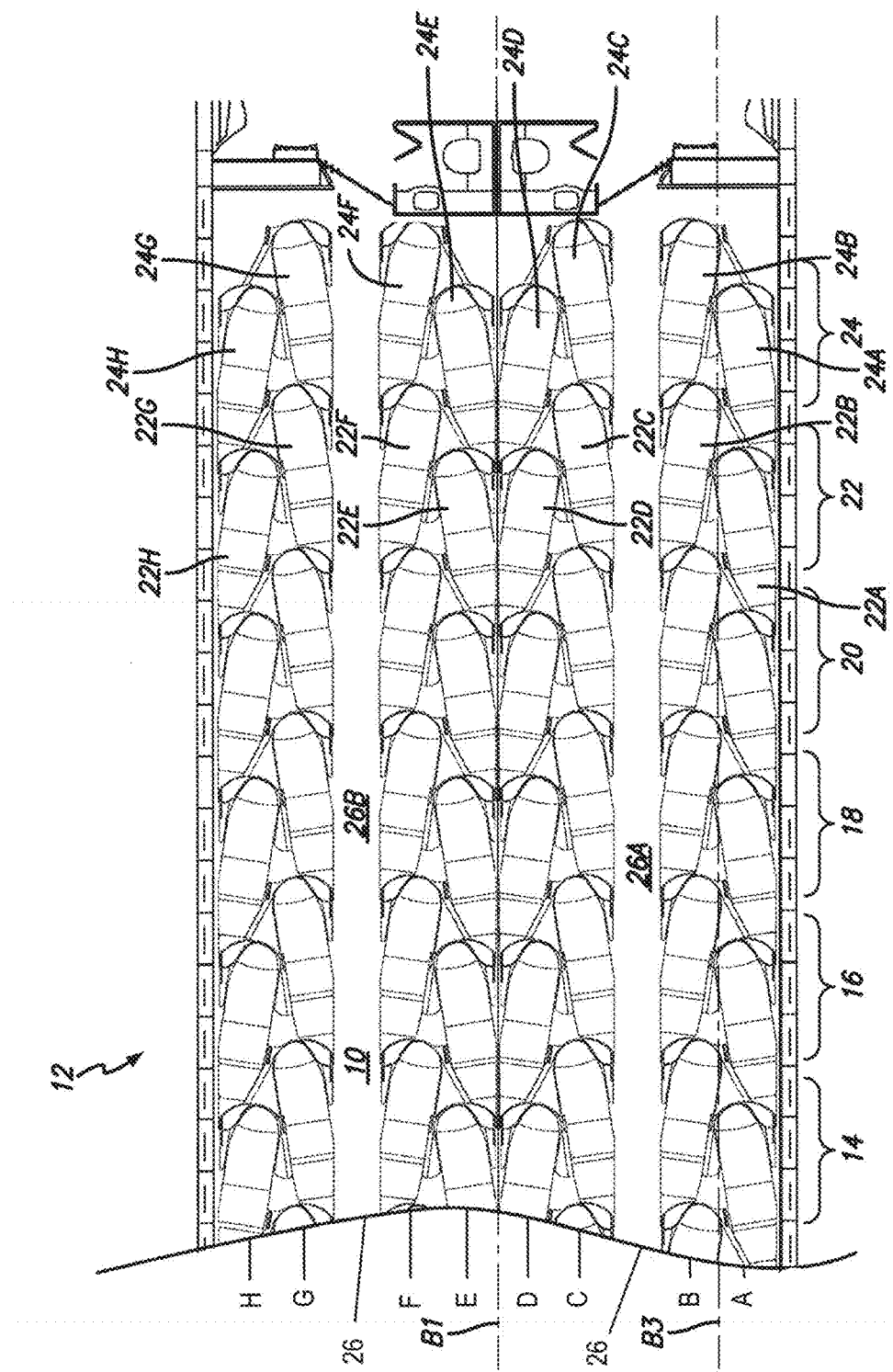
FIG. 1 is a top plan view of a 2-4-2 aircraft seating configuration in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "upper," "lower," "side," "short," "long," "up," "down," and "below" used herein are merely for ease of description and refer to the orientation of the components as shown in the figures. It should be understood that any orientation of the components described herein is within the scope of the present invention.

Referring now to the drawings, which are for purposes of illustrating the present invention and not for purposes of limiting the same, FIGS. 1-20 show two related preferred embodiments of an aircraft seating configuration within the cabin 10 of an aircraft 12. FIGS. 1-10 will be discussed first. FIG. 1 includes seat rows 14, 16, 18, 20, 22 and 24 and seat columns A, B, C, D, E, F, G and H. It will be understood that an aircraft cabin may include more or less rows or columns and that the number of rows or columns shown herein are not limiting, but are shown only for illustrative purposes. As is shown, the seat rows 14, 16, 18, 20, 22 and 24 extend laterally across the cabin 10 between port and starboard sides and the seat columns A, B, C, D, E, F, G and H extend longitudinally along the cabin. The seat rows 22 and 24 are hereafter used for illustrative purposes and, using the standard seating nomenclature used in the art, include seats 22A, 22B, 22C, 22D, 22E, 22F, 22G and 22H and 24A, 24B, 24C, 24D, 24E, 24F, 24G and 24H, respectively, grouped in pairs. It will be understood that in the following descriptions the arrangement of these rows 22 and 24 are illustrative of the remaining rows 14, 16, 18, and 20 according to an embodiment of the invention. It will be appreciated by those skilled in the art that partial rows are possible to take into account placement of bulkheads, meal service equipment, restrooms and the like.

Figure 2:
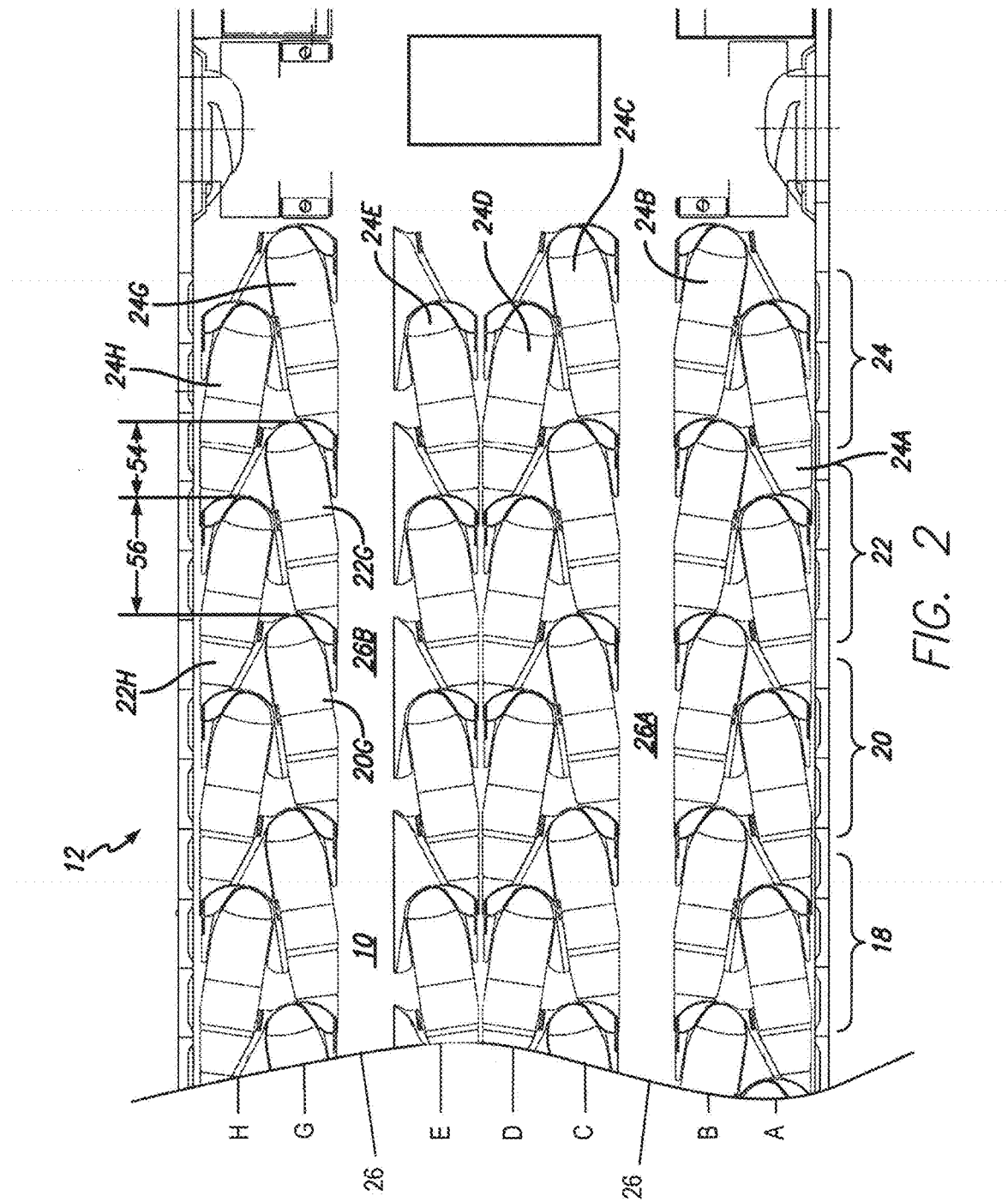
FIG. 2 is a top plan view of a 2-3-2 aircraft seating configuration in accordance with a preferred embodiment of the present invention.

FIG. 1 shows a 2-4-2 arrangement, with columns A and B on the port side, columns C, D, E and F in the center and columns G and H on the starboard side. FIG. 2 is similar to FIG. 1, but has eliminated the F column of seats to form a 2-3-2 arrangement. Those skilled in the art will understand that other arrangements are possible and are within the scope of the present invention. For example, on a single aisle aircraft a 2-2, 2-1 (or a mirror image of the same) or a 2-3 arrangement could be provided. On a twin aisle aircraft, a 2-2-2, 2-4-3, 3-3-3 or 3-4-3 arrangement could be provided.

Referring to FIG. 1, and using row 24 as an example, it can be seen that row 24 has eight seats in four groups of two seats. Seats 24A and 24B form the port group, seats 24C and 24D form the center-port group, seats 24E and 24F form the center-starboard group and seats 24G and 24H form the starboard group. Other rows include similar arrangements. These groups form two generally parallel aisles referred to generally herein as an aisle 26 or specifically as the port aisle 26a and the starboard aisle 26b.

The above-identified groups are arranged with the seats of each seat group longitudinally staggered with respect to one another, angled away from one another (with respect to the fore facing direction) and positioned at an offset angle in relation to the longitudinal axis B1 of the cabin 10. For example, seats 24A and 24B are adjacent to each other, but are longitudinally staggered (seat 24B being positioned aft with respect to seat 24A). Further, seats 24A and 24B are angled away from one another. Lastly, seats 24A and 24B are each positioned at an angle with respect to the longitudinal axis of the cabin 10. The angles will be discussed more fully below. Seats 24C and 24D are similarly longitudinally staggered with respect to one another (seat 24C being positioned aft with respect to seat 24D), angled away from one another and positioned at an offset angle in relation to the longitudinal axis of the cabin 10, as are seats 24E and 24F that make up the third seat group of row 24 (seat 24F being positioned aft with respect to seat 24E) and seats 24G and 24H that make up the fourth seat group of row 24 (seat 24G being positioned aft with respect to seat 24H).

In the embodiment shown in FIG. 1, every other seat in row 24 is generally parallel to one another in that they are all positioned at the same offset angle with relation to the longitudinal axis of the cabin 10. However, the parallel seats are longitudinally staggered fore or aft with respect to one another. For example, seats 24A, 24C, 24E and 24G are all generally parallel to each other. Furthermore, seats 24C and 24G are positioned aft with respect to seats 24A and 24E. Seats 24B, 24D, 24F and 24H, on the other hand, are positioned at an offset angle that is generally the same as, but opposite to, seats 24A, 24C, 24E and 24G and seats 24B and 24F are positioned aft with respect to seats 24D and 24H. In FIG. 1, the angle of offset with respect to the longitudinal axis of the cabin is 6.5°; so that seats 24A, 24C, 24E and 24G are positioned parallel to each other and positioned at an 13° angle with respect to seats 24B, 24D, 24F and 24H, respectively. Rows 14, 16, 18, 20 and 22 are identically arranged.

Figure 4:
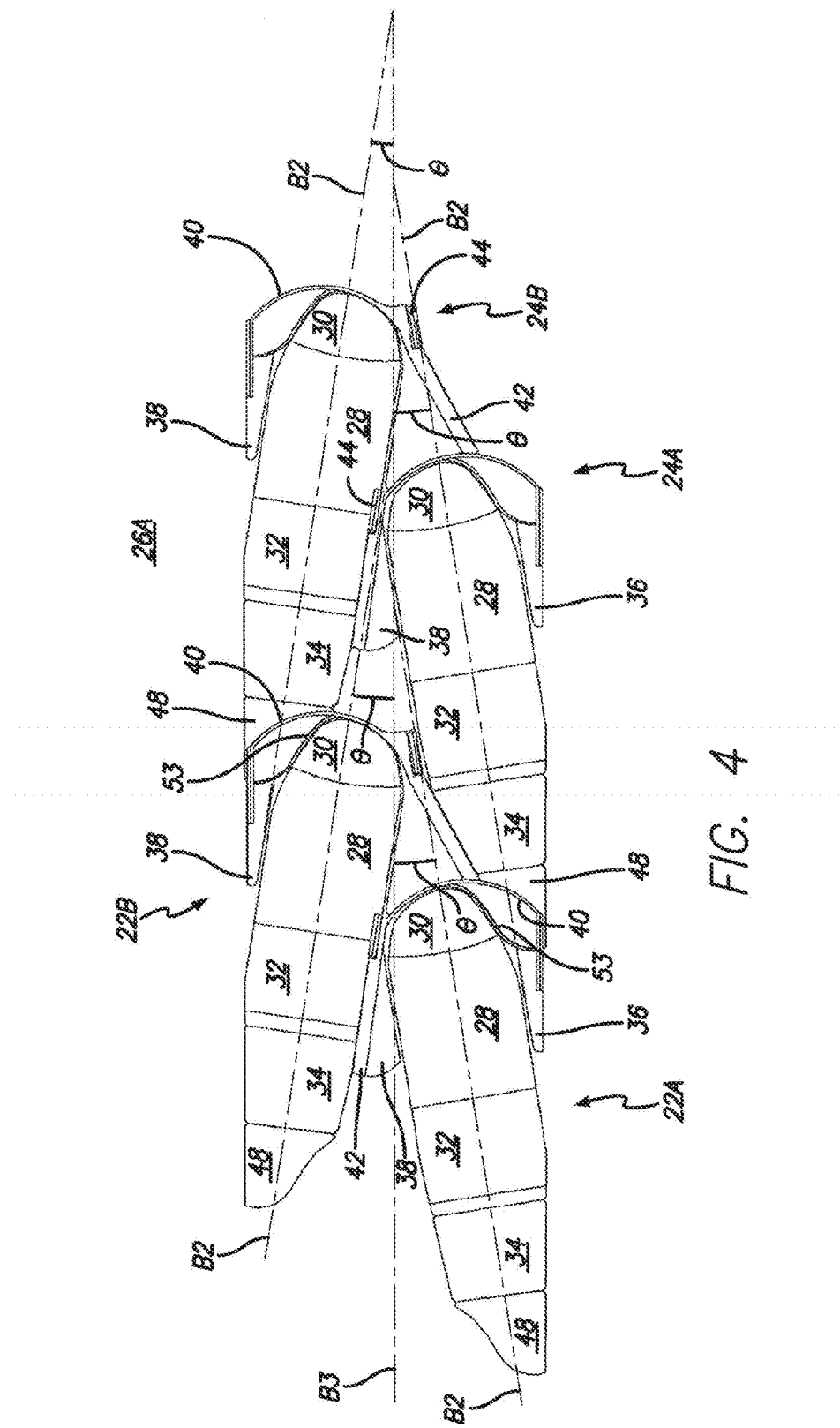
FIG. 4 is a top plan view of the two seat groups of FIG. 3 with each of the seats in the fully reclined position.

In other words, as shown in FIG. 4, each seat defines a longitudinal axis B2 and adjacent columns of seats (e.g., column A and column B) define a longitudinal axis B3 therebetween that extends approximately parallel to a longitudinal axis of the aircraft cabin B1. In a preferred embodiment, seats 22A and 24A face away from and form a non-parallel angle with longitudinal axis B3, and seats 22B and 24B face away from and form an angle with longitudinal axis B3. And, preferably, seats 22A and 24A are staggered fore of seats 22B and 24B.

The 6.5° angle of offset is illustrative of various offsets as may be required or desirable based on seat size, seat pitch, seat density, aisle width, cabin length and cabin width. The angle can be changed as desired or required by the criteria discussed above. In a preferred embodiment, the offset angle θ (see FIG. 4) between the longitudinal axis B2 of each seat and the longitudinal axis B1 of the cabin or the longitudinal axis B3 of adjacent columns of seats is between about 1° and about 44°, in a more preferred embodiment, the angle is between about 3° and about 20°, and in the most preferred embodiment, the angle is between about 5° and about 15°. The result of this arrangement is that either the same number of seats can be made somewhat longer than would be possible if the seats were aligned with the longitudinal axis of the cabin 10, or more seats can be fitted into a cabin than if they were aligned with the longitudinal axis of the cabin 10.

Referring now generally to FIGS. 3-10, the seating arrangement is generally shown for purposes of illustration with reference to port seats 22A, 22B and 24A, 24B. Each of the seats 22A, 22B, 24A and 24B (and all other seats) include a seat back 28, the upper portion of which includes or defines a head rest 30, seat bottom 32, leg rest 34, and arm rests 36 and 38. The seats are supported by frames which are in turn mounted to the deck of the aircraft by track fittings of a known type.

Figure 5:
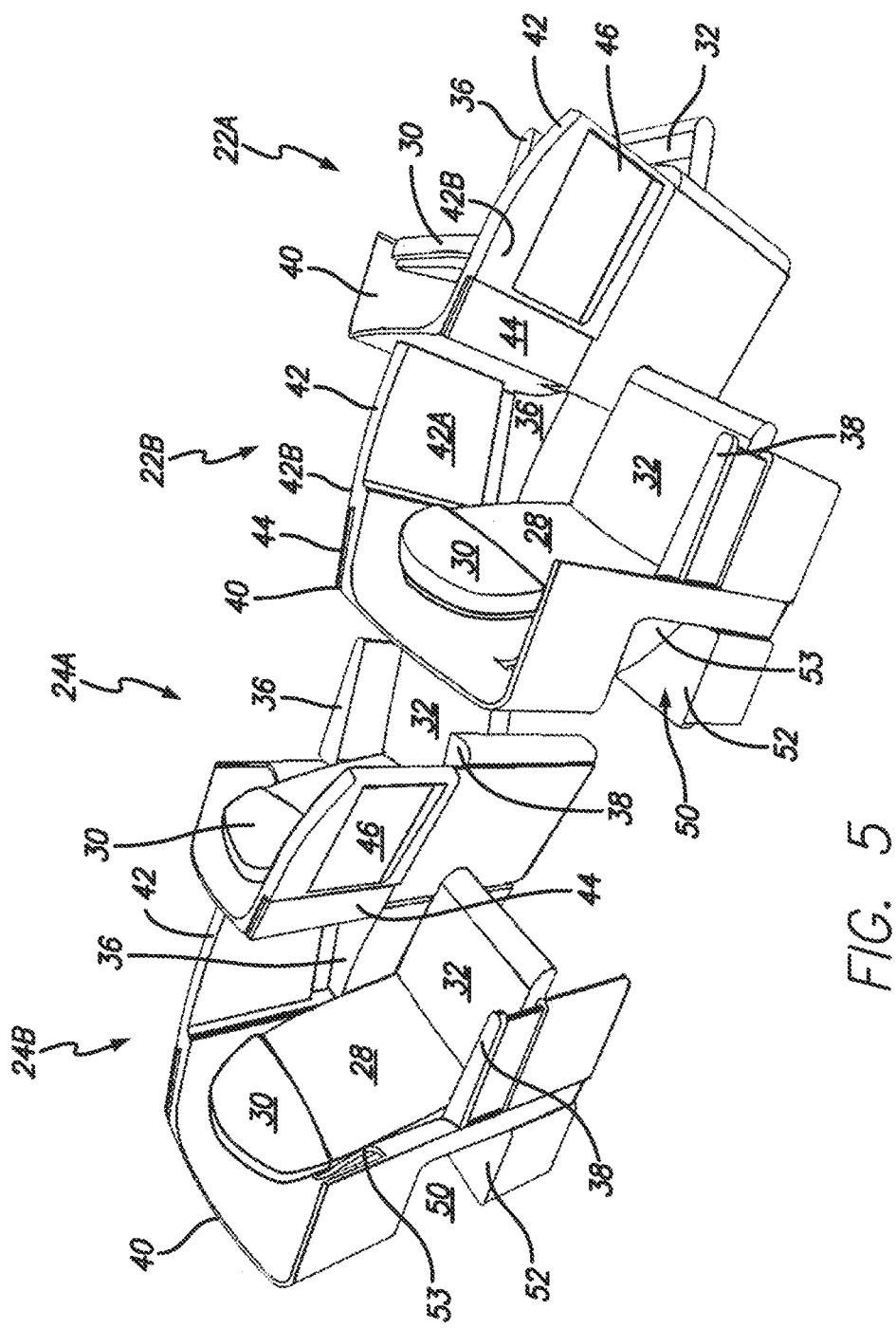
FIG. 5 is a perspective view of the seat groups of FIG. 3 with each of the seats in the upright position.

In a preferred embodiment, privacy shells 40 are provided which enclose the back and sides of the seats. Preferably, as shown in FIG. 5, the privacy shells 40 within a seating pair or group (e.g., seats 24A and 24B) are integral with one another. As used herein, integral means that the privacy shells 40 within a seating pair or group are attached, connected or otherwise secured to one another. However, this is not a limitation, and the privacy shells 40 can be separate from one another. Preferably, each privacy shell 40 includes an integral console portion 42 (having an inside surface 42a and an outside surface 42b) that includes passenger components. The passenger components can be, for example, and without limitation, a foldable and/or stowable tray table 44 and a monitor 46, together with required electronics (such as a remote control, game controller, volume and channel controls) and the like. The privacy shell 40 or console portion 42 can include other passenger components or amenities, such as a storage cabinet, cup holder, storage pocket, lights and the like, as are known in the art.

Figure 6:
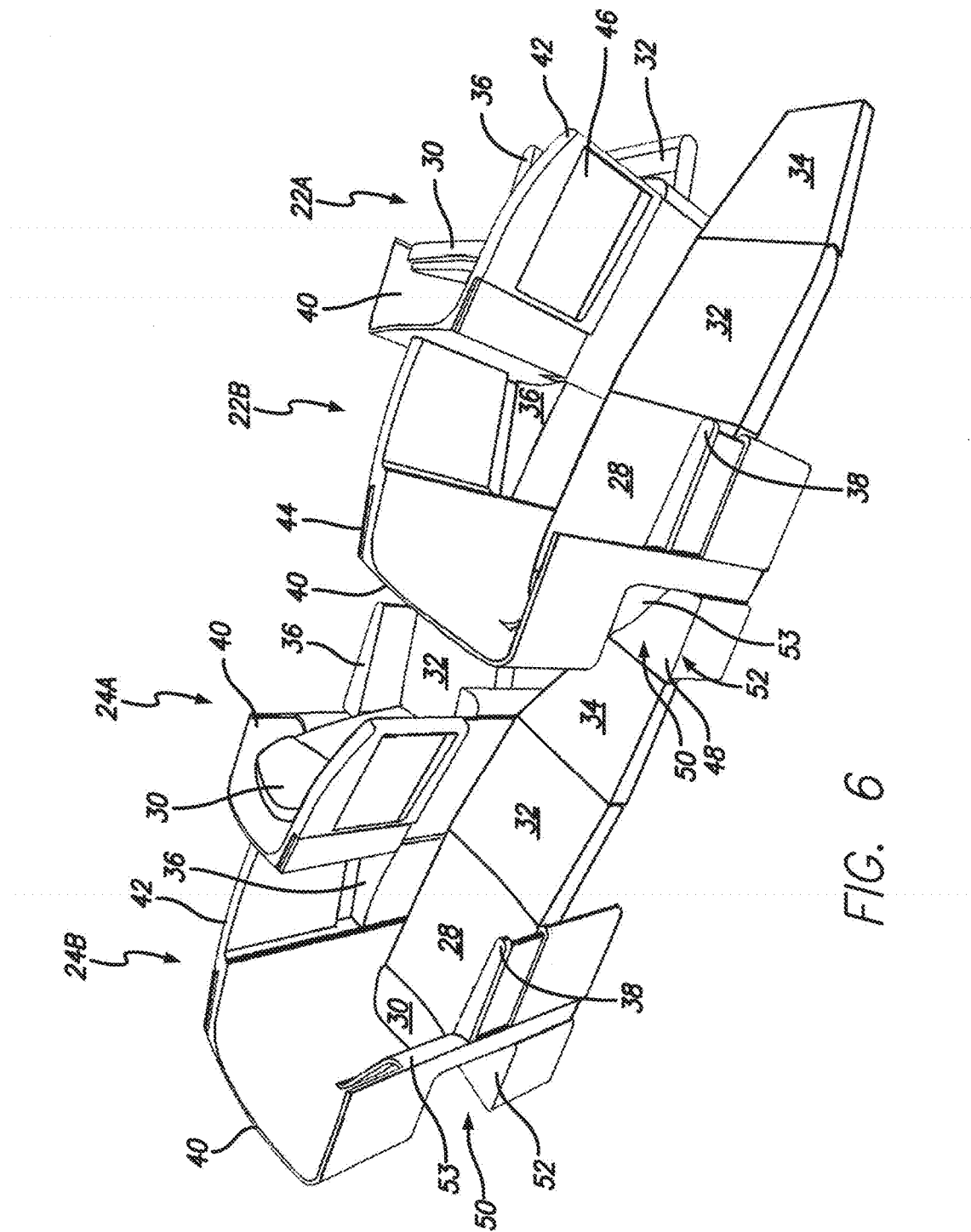
FIG. 6 is a perspective view of the seat groups of FIG. 3 with some of the seats in the upright position and some of the seats in the fully reclined position.

As described below, seats 22A, 22B, 24A and 24B are movable between an upright or non-reclined position and a fully reclined or bed position. Preferably, seats 22A, 22B, 24A and 24B include a seat extension 48 that provides a support surface for supporting a passenger's lower legs and feet in the fully reclined position. In a preferred embodiment, each privacy shell 40 includes a foot recess 50 and associated foot support 52 that supports the seat extension 48 of the seat directly aft when the seat is in the fully reclined position, as shown in FIG. 6. In its stowed position, the seat extension 48 is positioned under the seat bottom 32 of seat 12A.

Figure 3:
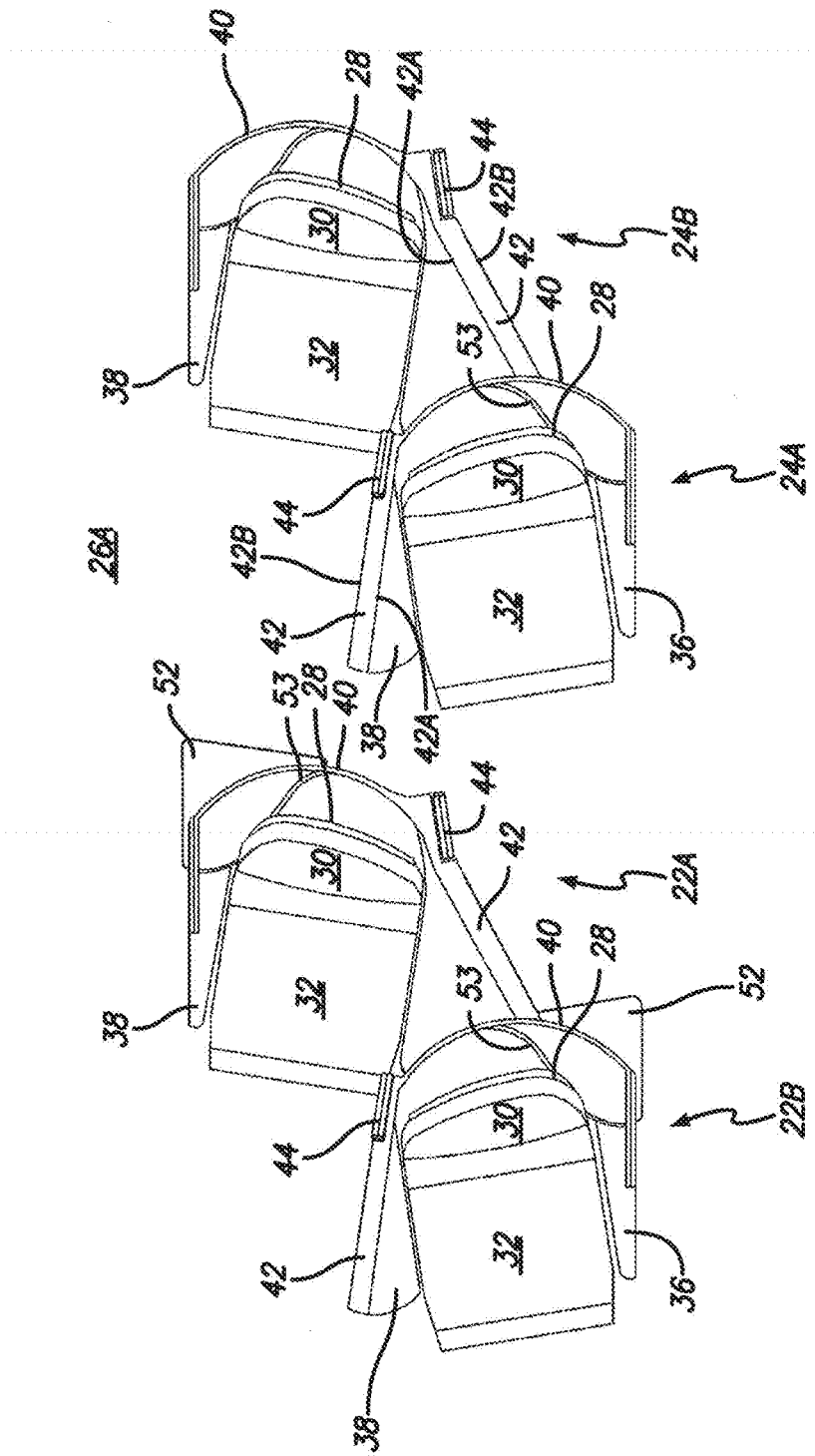
FIG. 3 is a top plan view of two seat groups with each of the seats in the upright position.

Seats 22A, 22B, 24A and 24B are provided with appropriate moveable components, actuators, and controls to enable a passenger to put the seats into various configurations, including the upright, seated or non-reclined configuration, FIG. 3; a fully reclined or bed configuration in which the seat serves as a bed, FIG. 4; and a number of intermediate configurations (not shown). As is also best shown in FIGS. 4 and 6, when the seat 24B is in the fully reclined position, the seat back 28 and head rest 30 become the "head end" of the bed, the seat bottom 32 becomes the "middle" portion, and the leg rest 34 and seat extension 48 become the "foot end" (with the seat extension 48 positioned on the foot support 52 of seat 22B). The seat extension 48 is supported on foot support 52 positioned above the cabin deck at a height to support the seat extension 48 in essentially the same level as the seat bottom 32.

Referring to FIG. 4, in a preferred embodiment of the present invention, each seat includes an asymmetrical head rest 30. However, this is not a limitation on the present invention and a symmetrical head rest can be used. The asymmetrical head rest 30 helps optimize the longitudinal overlap between the seats. As is shown in FIG. 4, the foot recess 50 is partially defined by a wall 53 that separates the asymmetrical head rest 30 from the extension 48 of the seat directly aft. The head rest 30 and extension 48 are shaped to conform to the shape of the wall 53. This helps maximize longitudinal overlap between fore and aft seats.

With reference to FIG. 2, in a preferred embodiment, the orientation of the seats provides for a longitudinal overlap or stagger of a first dimension 54 or a second dimension 56. As is shown in FIG. 2, the dimension can be measured from the top of the head rests 30 when the seats are in the fully reclined position. In a preferred embodiment, the first dimension is about 28" and the second dimension is about 41". However, these dimensions can be changed as conditions and size dictate.

Figure 7:
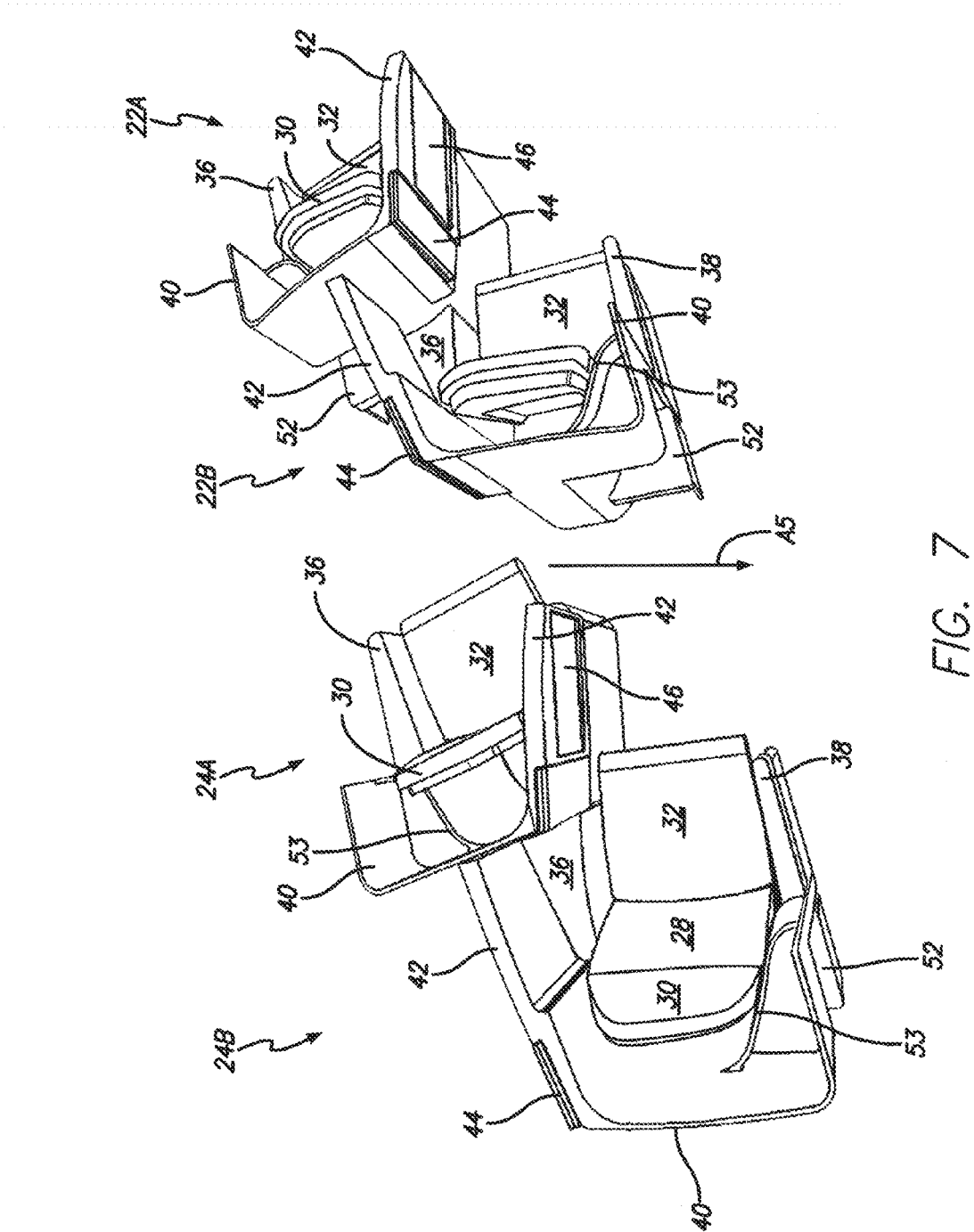
FIG. 7 is another perspective view of the seat groups of FIG. 3 with each of the seats in the upright position and showing the aisle access for the window seated passenger.
Figure 8:
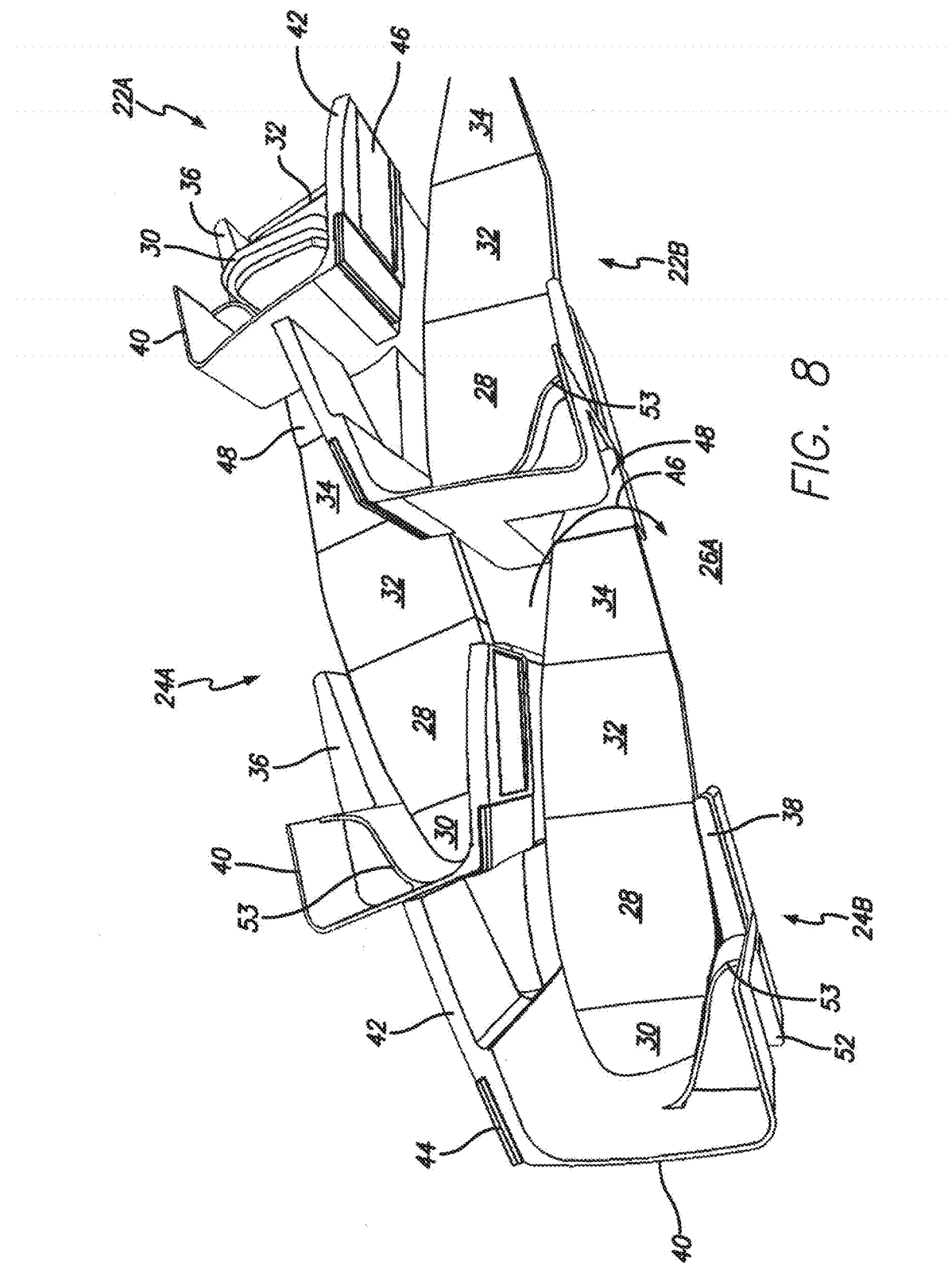
FIG. 8 is another perspective view of the seat groups of FIG. 3 with some of the seats in the fully reclined position and showing the aisle access for the window seated passenger.

As is shown in FIGS. 7 and 8, the seating arrangement described herein provides aisle access for passengers seated in window or center seats. For example, as shown in FIG. 7, the passenger seated in seat 24A has access to aisle 26a through the space defined between seat 24B and the back of privacy shell 40 of seat 22B, when seat 24B is in the non-reclined position (see arrow A5). In most instances, this access to the aisle is provided without the aisle passenger having to get up from their seat or move their legs. As shown in FIG. 8, the passenger seated in seat 24A has access to aisle 26a by stepping over the leg rest 34 of seat 24B, when seat 24B is in the reclined position (see arrow A6).

Figure 9:
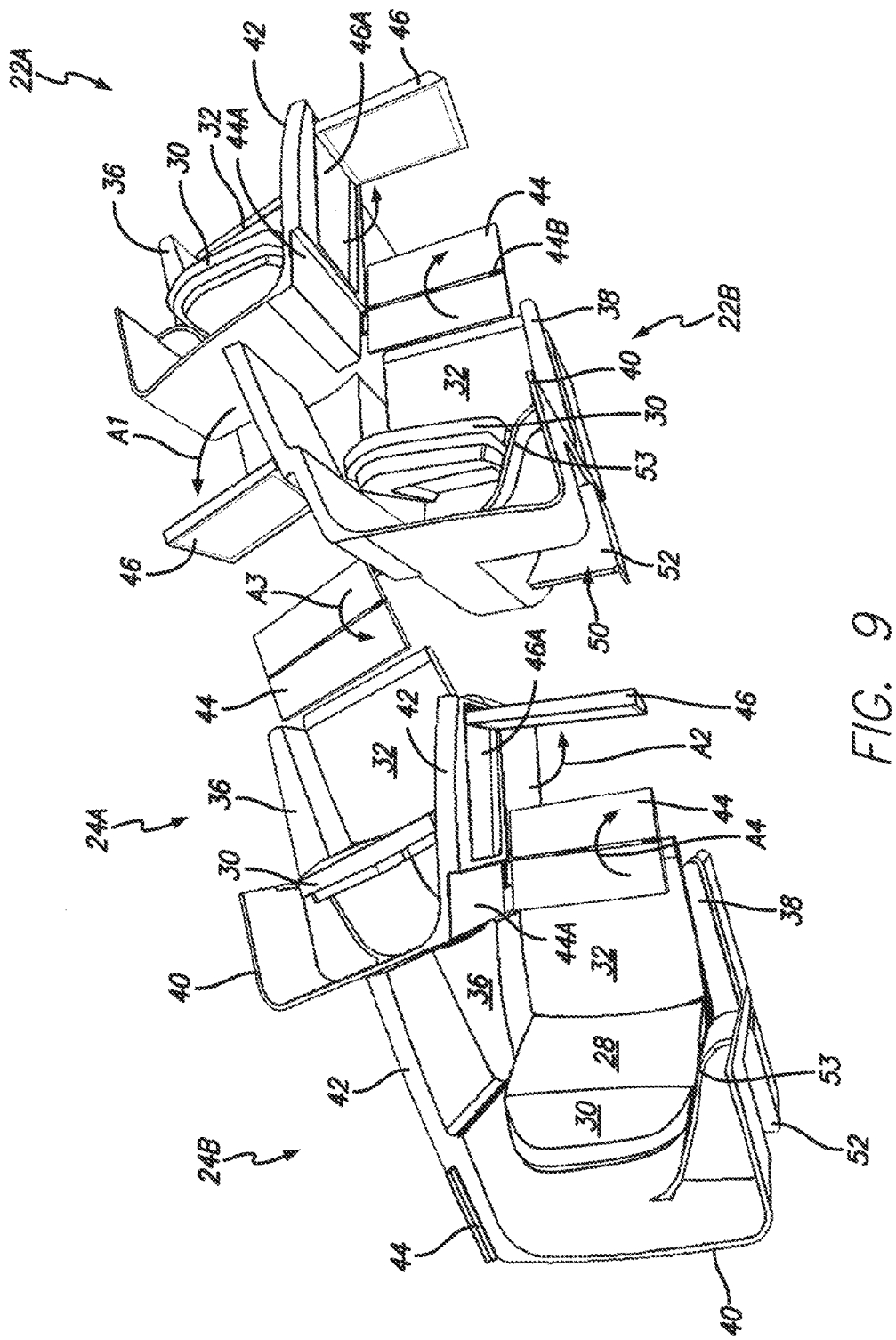
FIG. 9 is a perspective view of the seat groups of FIG. 3 that shows deployment of monitors and tray tables.
Figure 10:
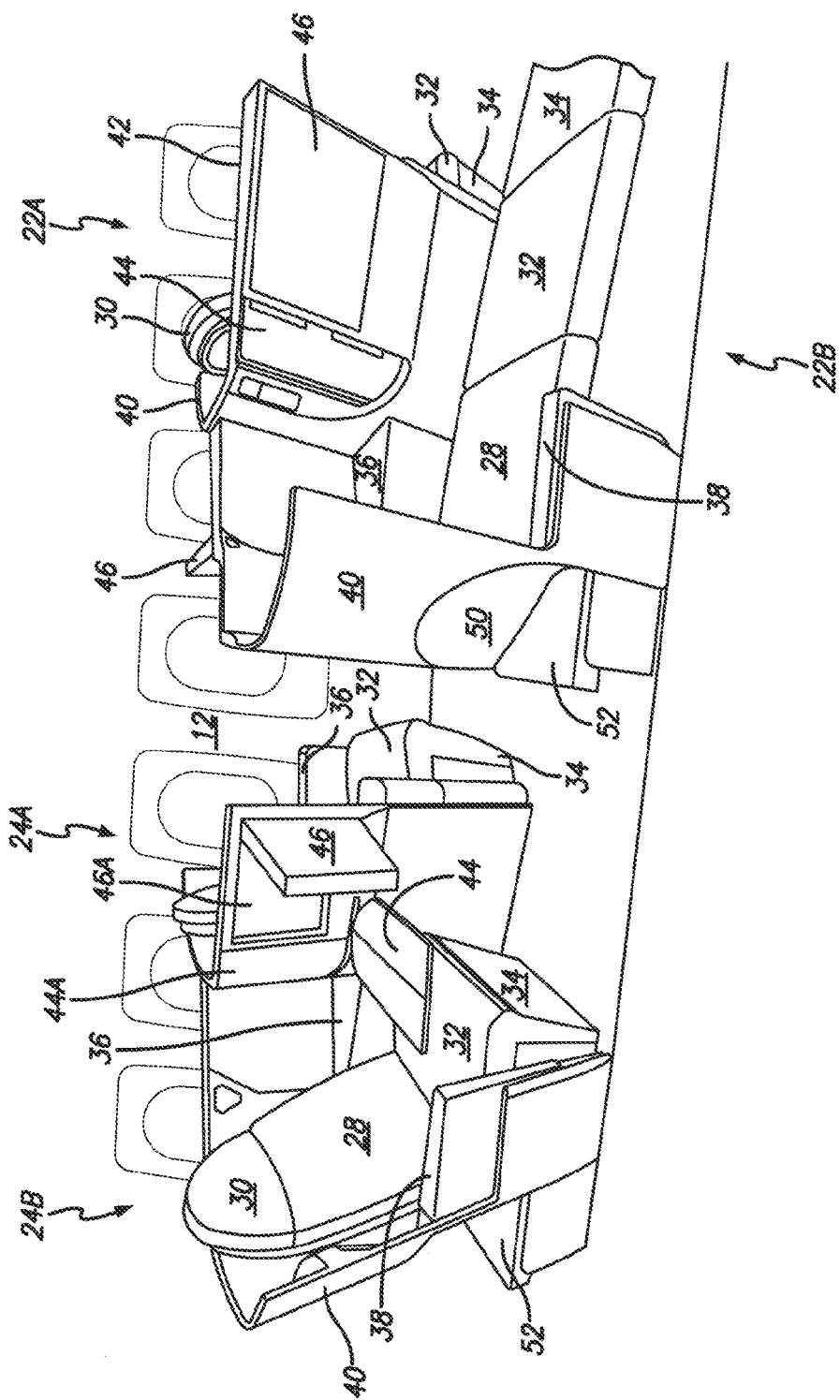
FIG. 10 is a perspective view of the seat groups of FIG. 3 in the cabin of an aircraft.

As is shown in FIGS. 9 and 10, the seats each include an individual viewing monitor 46. In a preferred embodiment, the monitor 46 is pivotal and is affixed to the console portion 42 of the privacy shell 40 of an adjacent or fore seat. For example, as shown in FIG. 9, the monitor 46 for the passenger seated in seat 24B is pivotally secured to the console portion 42 of the privacy shell 40 of seat 24A, the monitor 46 for the passenger seated in seat 24A is pivotally secured to the console portion 42 of the privacy shell 40 of seat 22B, and the monitor 46 for the passenger seated in seat 22B is pivotally secured to the console portion 42 of the privacy shell 40 of seat 22A. In a preferred embodiment, some monitors 46 are pivotal toward the passenger and others are pivotal away from the passenger. This is dictated by spacing desirability. Within a seating group or pair, the monitor 46 positioned on the console portion 42 of the privacy shell 40 of the aft seat pivots toward the passenger (seated aft) and the monitor 46 positioned on the console portion 42 of the privacy shell 40 of the fore seat pivots away from the passenger (seated aft). For example, as shown in FIG. 9, the monitor 46 positioned on the console portion 42 of the privacy shell 40 of seat 22B pivots toward the passenger seated in seat 24A (see arrow A1) and the monitor 46 positioned on the console portion 42 of the privacy shell 40 of seat 24A pivots away from the passenger seated aft in seat 24B (see arrow A2).

As is shown in FIG. 9, the monitor 46 is stowed in a monitor recess 46a. In other embodiments, the monitor 46 may be positioned in the back of the privacy shell 40 in the seat fore of the passenger. For example, for a passenger seated in seat 24B, the monitor 46 would be positioned in the back of the privacy shell 40 of seat 22B.

As is also shown in FIGS. 9 and 10, the seats each include an individual tray table 44. In a preferred embodiment, the tray table 44 is vertically stowed and pivotal downwardly and is then foldable toward the passenger via a hinge 44b in the middle of the tray table 44. As is shown in FIG. 9, the tray table 44 is stowed in a tray table recess 44a in the console portion 42 of the privacy shell 40 of an adjacent or fore seat. For example, as shown in FIG. 9, the tray table 44 for the passenger seated in seat 24B is pivotally secured to the console portion 42 of the privacy shell 40 of seat 24A, the tray table 44 for the passenger seated in seat 24A is pivotally secured to the console portion 42 of the privacy shell 40 of seat 22B, and the tray table 44 for the passenger seated in seat 22B is pivotally secured to the console portion 42 of the privacy shell 40 of seat 22A. In a preferred embodiment, after the tray table 44 has been pivoted downwardly, some tray tables 44 are foldable toward the passenger and others are foldable away from the passenger. This is dictated by spacing desirability. Within a seating group or pair, the tray table 44 positioned on the console portion 42 of the privacy shell 40 of the aft seat folds toward the passenger (seated aft) and the tray table 44 positioned on the console portion 42 of the privacy shell 40 of the fore seat folds away from the passenger (seated aft). For example, as shown in FIG. 9, the tray table 44 positioned on the console portion 42 of the privacy shell 40 of seat 22B folds toward the passenger seated in seat 24A (see arrow A3) and the tray table 44 positioned on the console portion 42 of the privacy shell 40 of seat 24A folds away from the passenger seated aft in seat 24B (see arrow A4). In other embodiments, the tray table may be a solid piece and not foldable.

FIGS. 11-20 show a second embodiment of a seating arrangement. This embodiment is similar to the embodiment described above. Accordingly, the privacy shell 40 of each seat includes an integral console portion 42 that includes passenger components. The passenger components can be, for example, and without limitation, a foldable and/or stowable tray table 44 and a monitor 46, together with required electronics 47 (such as a remote control, game controller, volume and channel controls) and the like. The privacy shell 40 or console portion 42 can include other passenger components or amentities, such as a storage cabinet, cup holder, storage pocket, lights and the like, as are known in the art.

Figure 15:
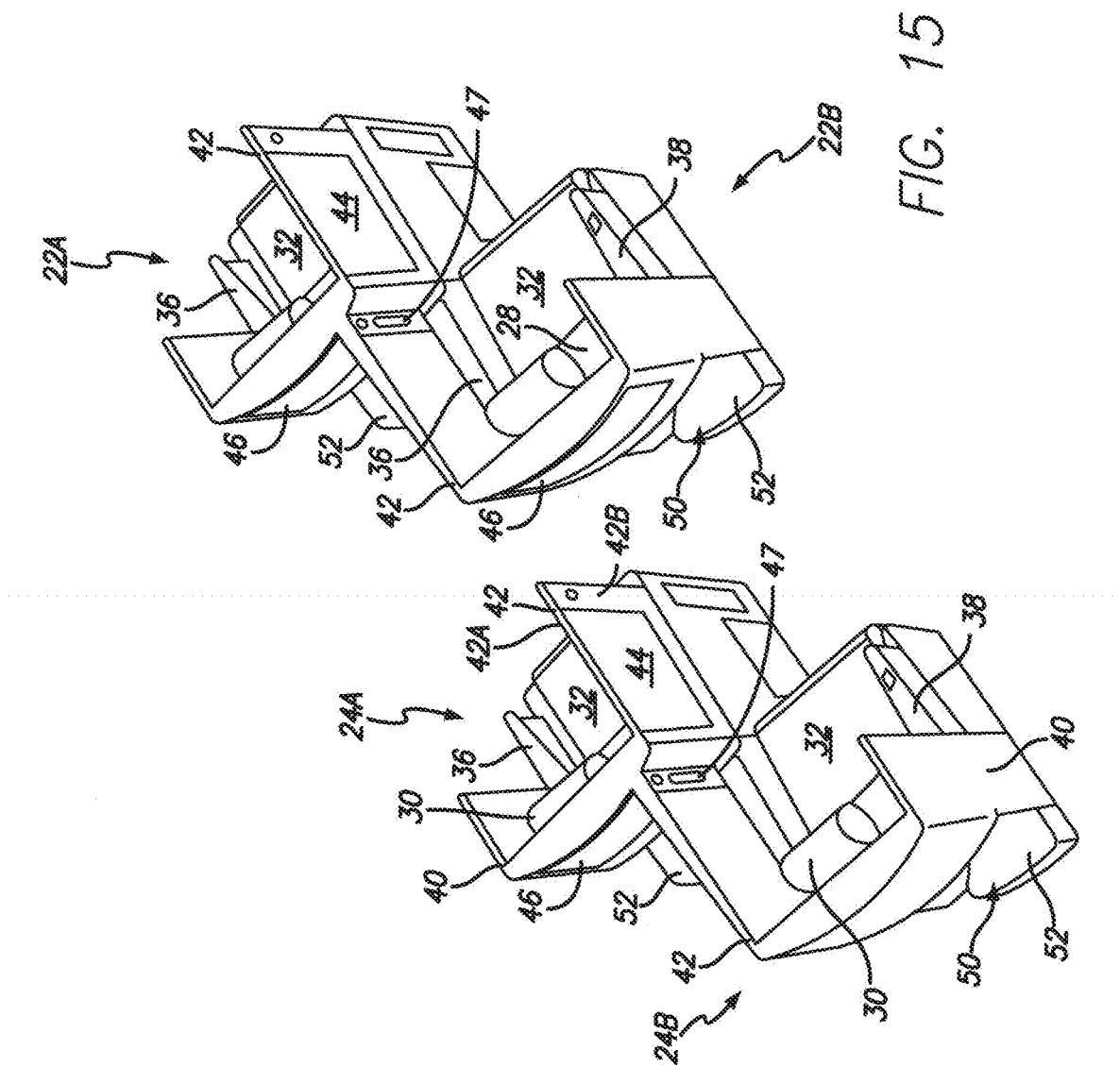
FIG. 15 is another perspective view of the seat groups of FIG. 13 with each of the seats in the upright position.
Figure 16:
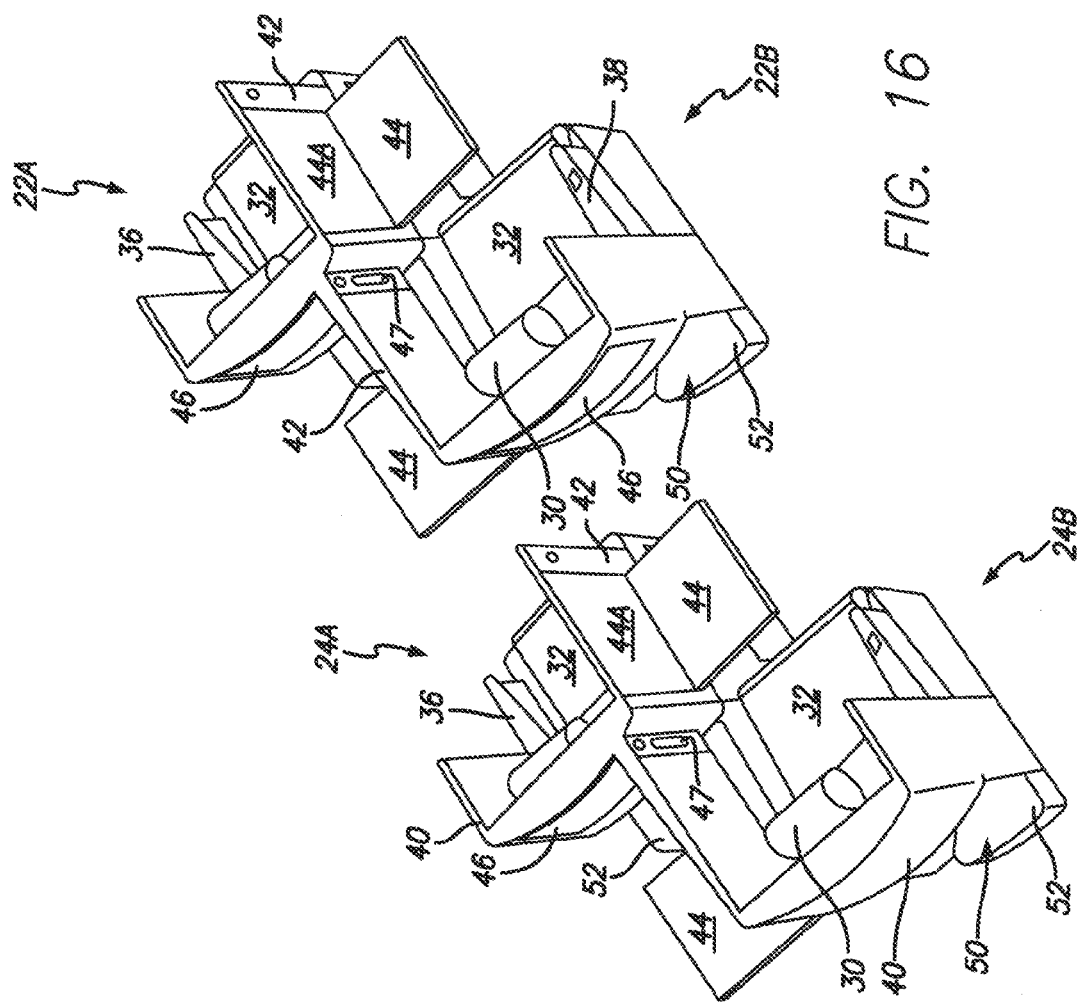
FIG. 16 is a perspective view of the seat groups of FIG. 13 with the seats in the upright position and with the tray tables folded down.
Figure 17:
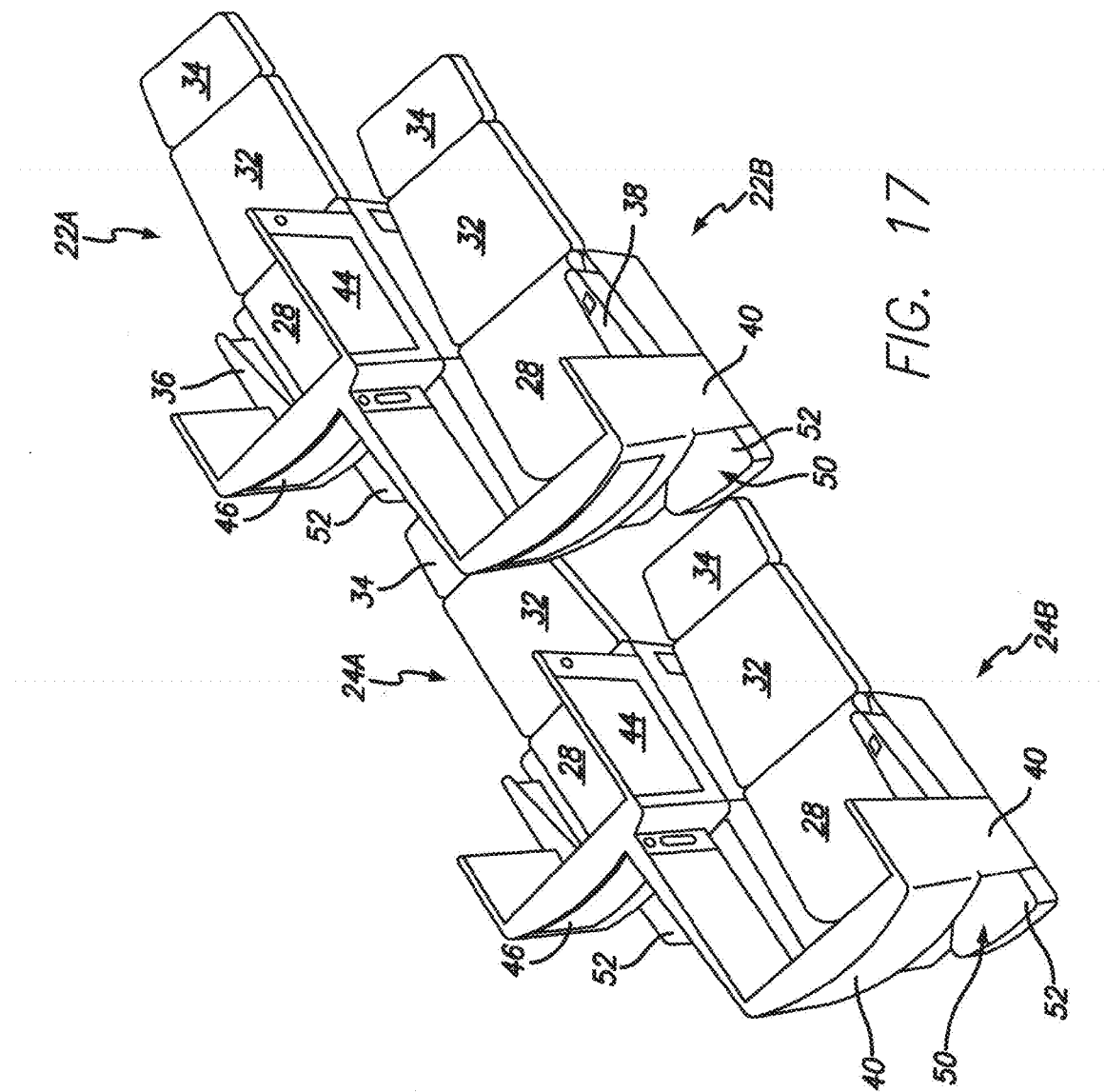
FIG. 17 is a perspective view of the seat groups of FIG. 13 with each of the seats in the fully reclined position.
Figure 18:
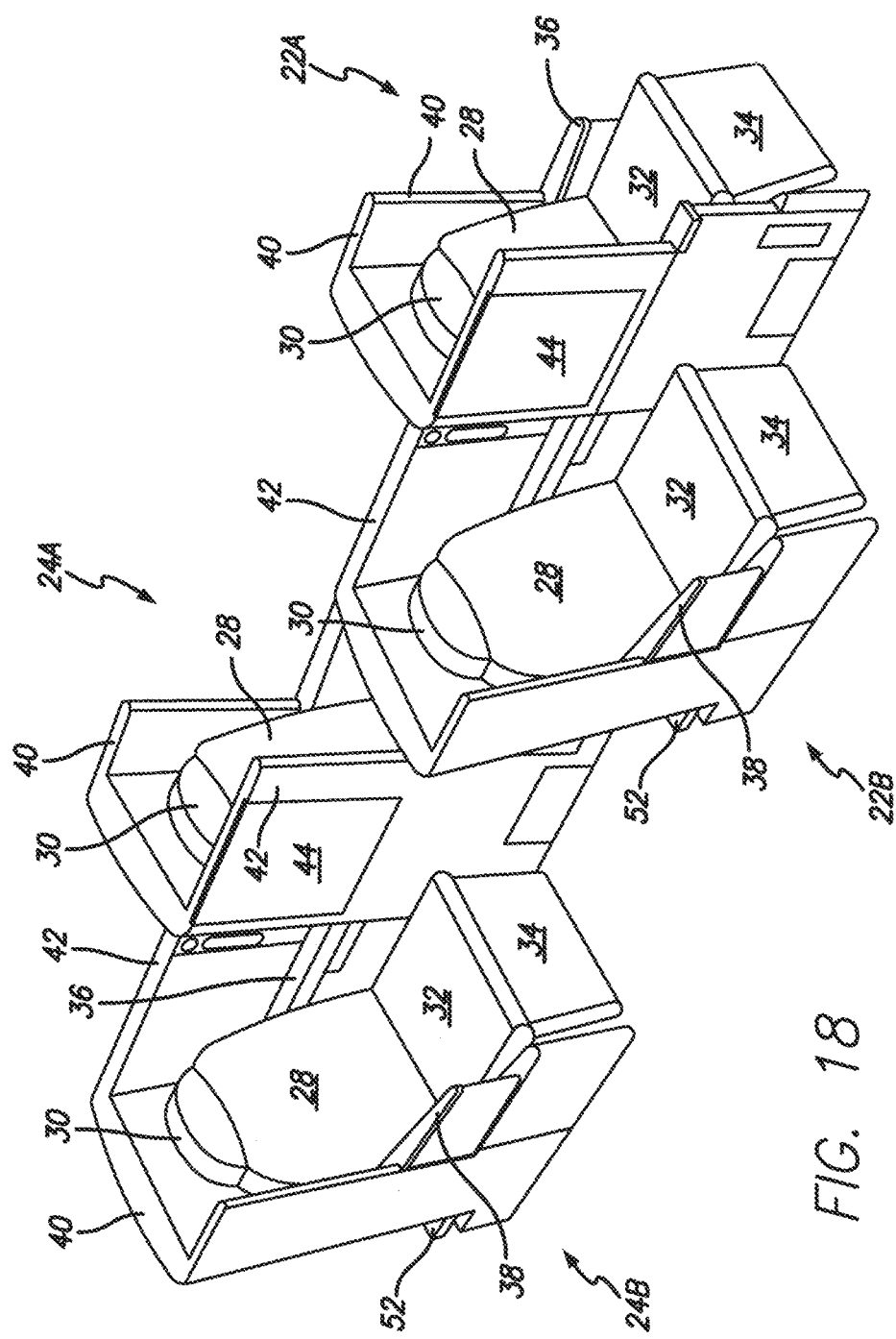
FIG. 18 is a perspective view of the seat groups of FIG. 13 with the seats in the upright position.
Figure 19:
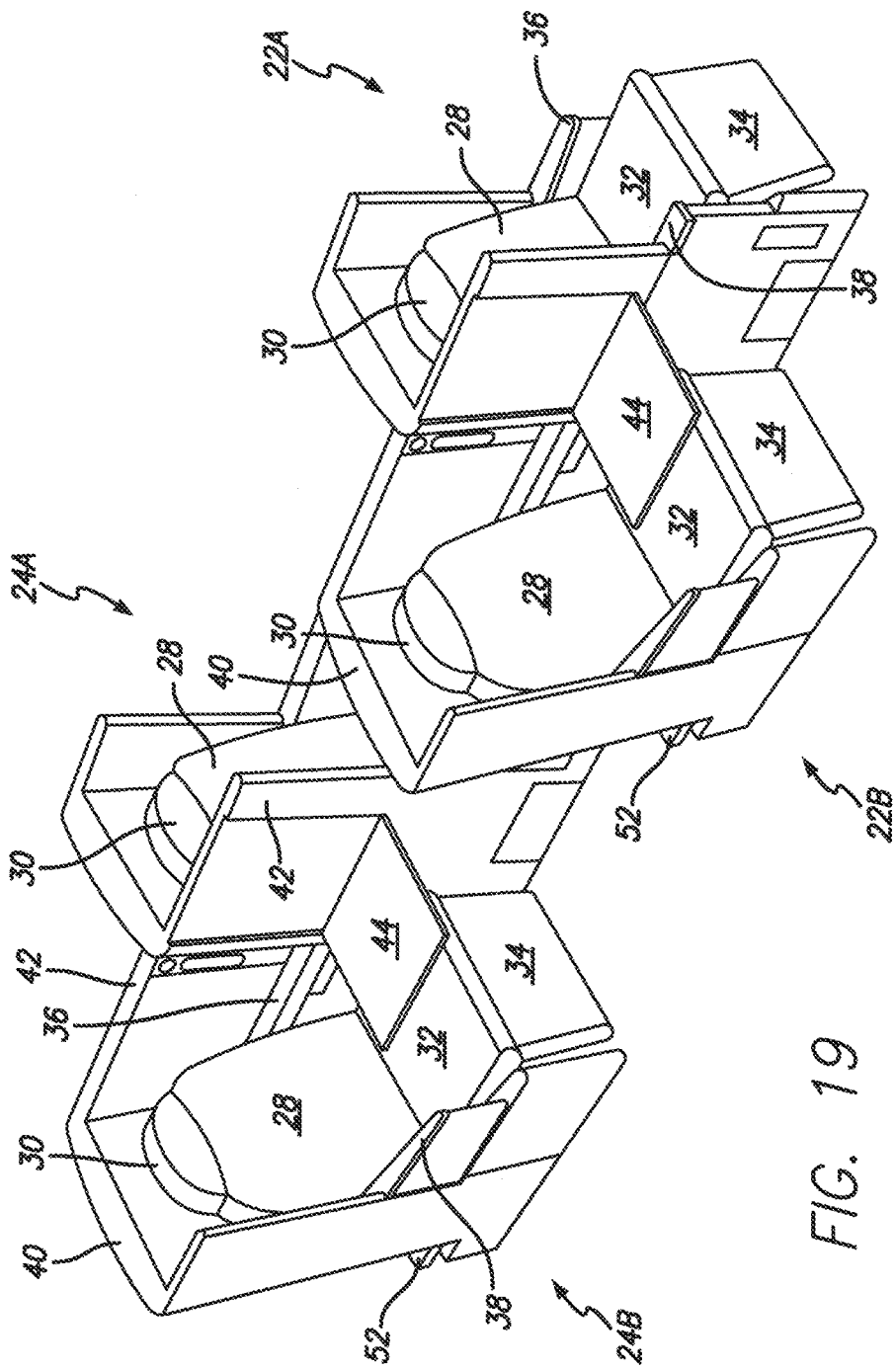
FIG. 19 is a perspective view of the seat groups of FIG. 13 that shows deployment of the tray tables.

As is shown in FIGS. 15 and 16, the seats each include an individual viewing monitor 46 positioned on the back of the privacy shell 40 so that the passenger positioned there behind can watch TV. For example, as shown in FIG. 15, the monitor 46 for the passenger seated in seat 24A is located on the privacy shell 40 of seat 24A. In a preferred embodiment, the monitor 46 is stationary. However, it can be pivotal or movable if desired.

As is also shown in FIGS. 15 and 16, the seats each include an individual tray table 44. In a preferred embodiment, the tray table 44 is vertically stowed and pivotal downwardly. As is shown in FIG. 16, the tray table 44 is stowed in a tray table recess 44a in the exterior surface 42b of the console portion 42 of the privacy shell 40 of an adjacent or fore seat. For example, as shown in FIG. 16, the tray table 44 for the passenger seated in seat 24B is pivotally secured to the console portion 42 of the privacy shell 40 of seat 24A, the tray table 44 for the passenger seated in seat 24A is pivotally secured to the console portion 42 of the privacy shell 40 of seat 22B, and the tray table 44 for the passenger seated in seat 22B is pivotally secured to the console portion 42 of the privacy shell 40 of seat 22A.

Figure 20:
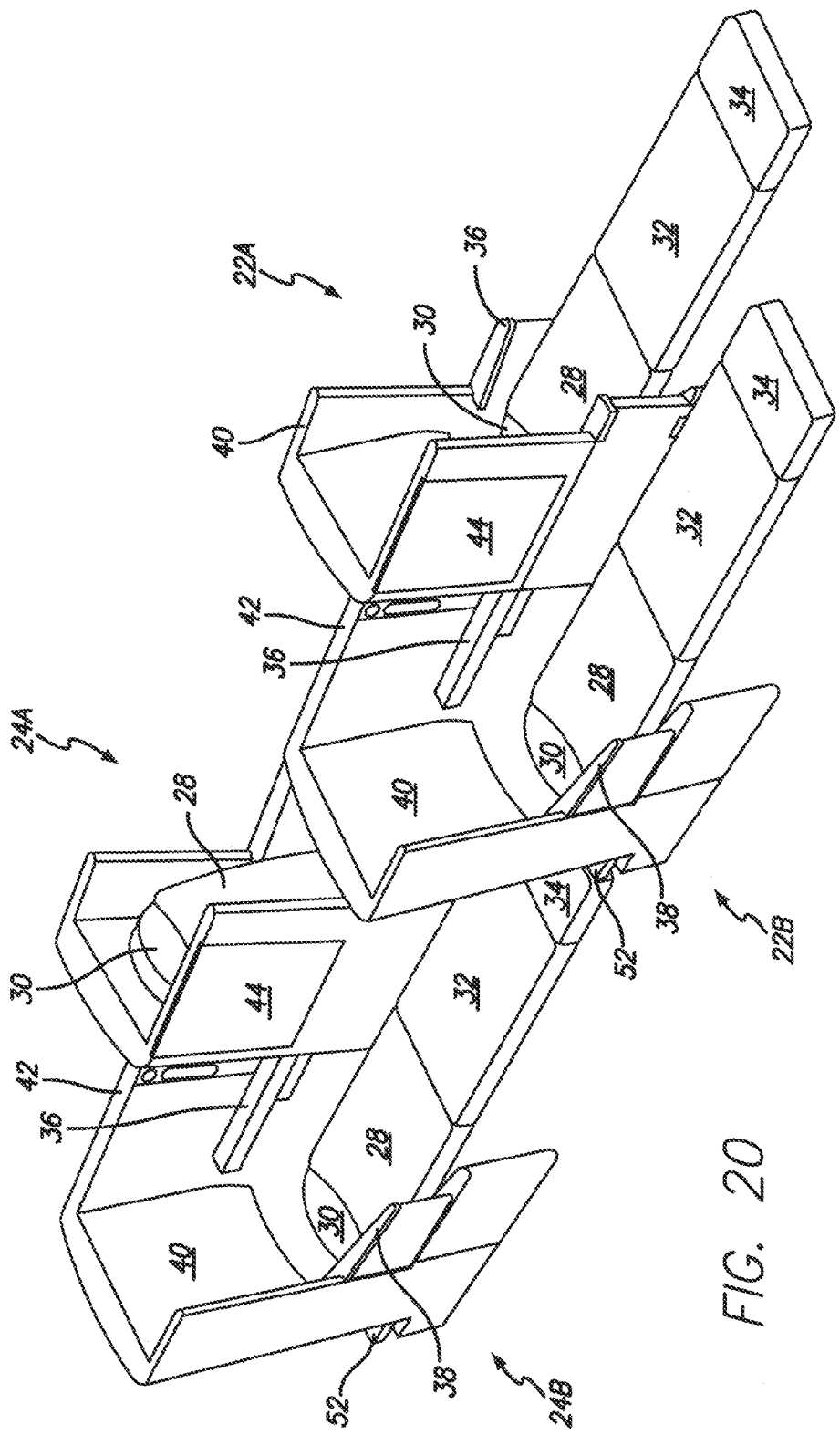
FIG. 20 is another perspective view of the seat groups of FIG. 13 with one seat in the upright position and the remaining seats in the fully reclined position.

As is shown in FIG. 15, in a preferred embodiment, another passenger component, such as an electronic component 47 like a seat controller, game controller or remote TV control can be positioned on the interior surface 42a of the console portion. Therefore, passenger components located on the exterior surface 42b of the console portion 42 are for use by a passenger in the seat adjacent/aft thereof and passenger components located on the interior surface 42a of the console portion 42 are for the passenger in the seat associated with the privacy shell 40. For example, for seat 24A, the tray table 44 located on the exterior surface 42b of the console portion 42 is for use by the passenger in seat 24B and the controller 47 located on the interior surface 42a of the console portion 42 is for use by the passenger in seat 24A. As shown in FIG. 20, in this embodiment, the seat extension 48 is omitted. However, it can be added, if desired.

Figure 11:
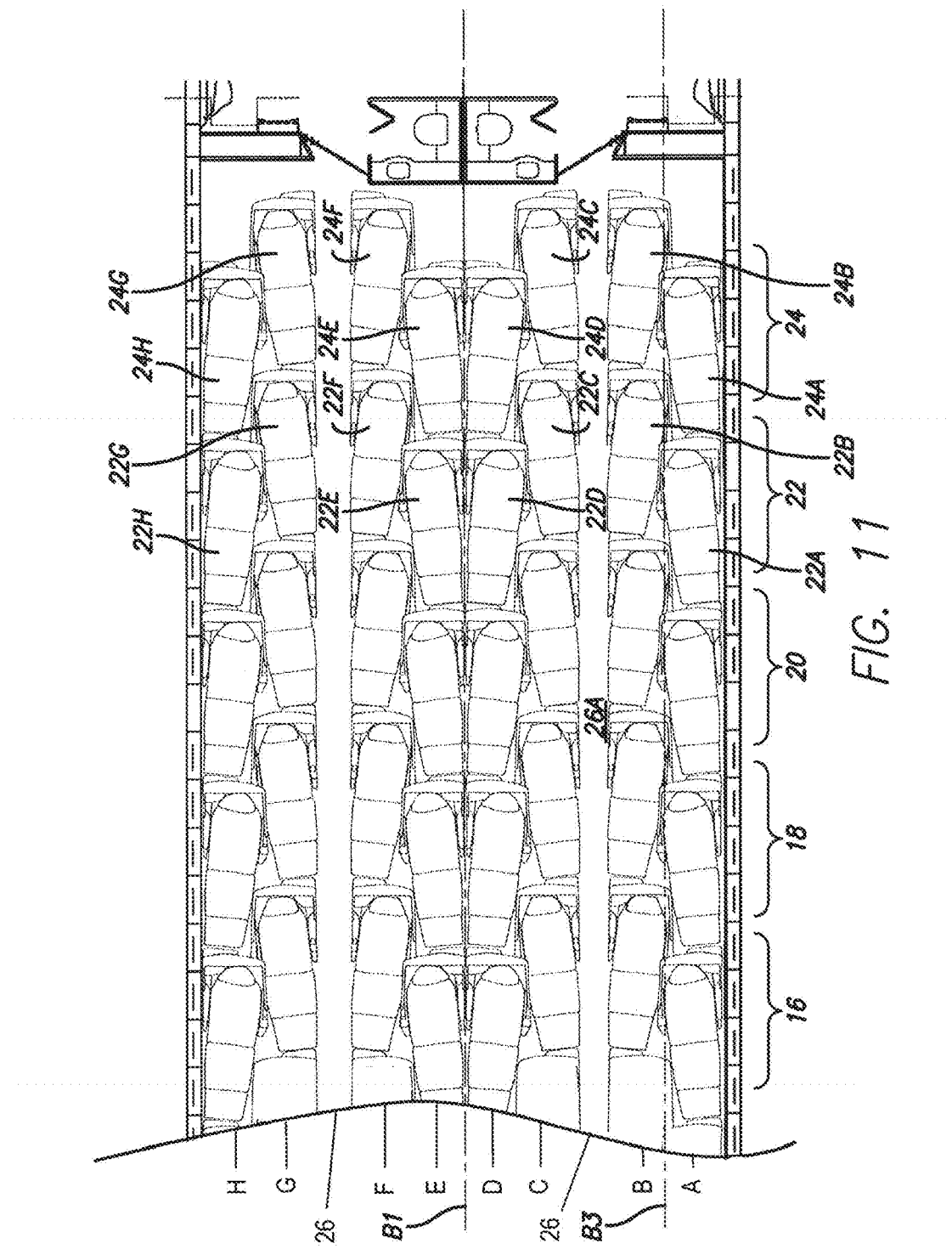
FIG. 11 is a top plan view of a 2-4-2 aircraft seating configuration in accordance with another preferred embodiment of the present invention.
Figure 12:
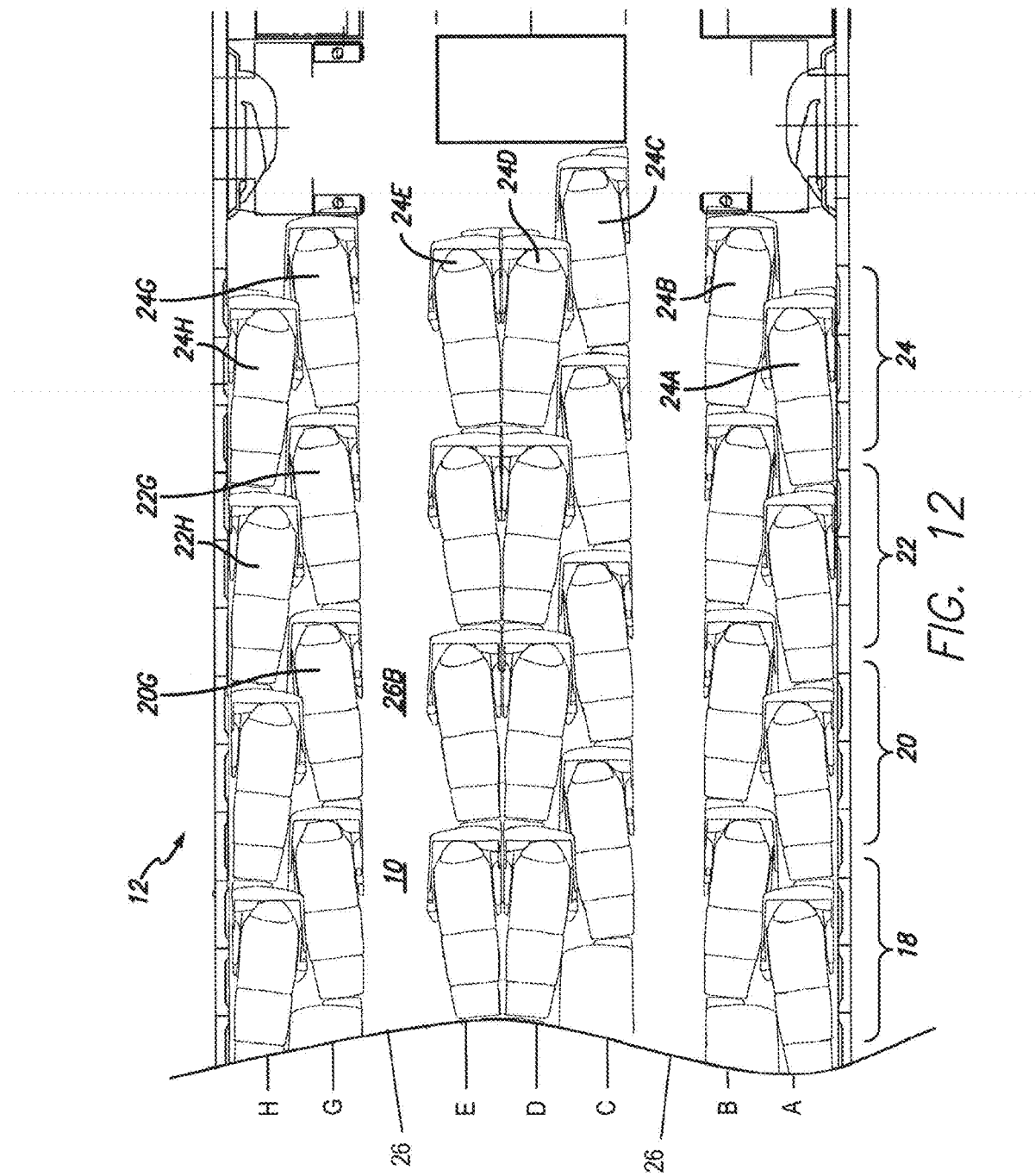
FIG. 12 is a top plan view of a 2-3-2 aircraft seating configuration in accordance with another preferred embodiment of the present invention.
Figure 13:
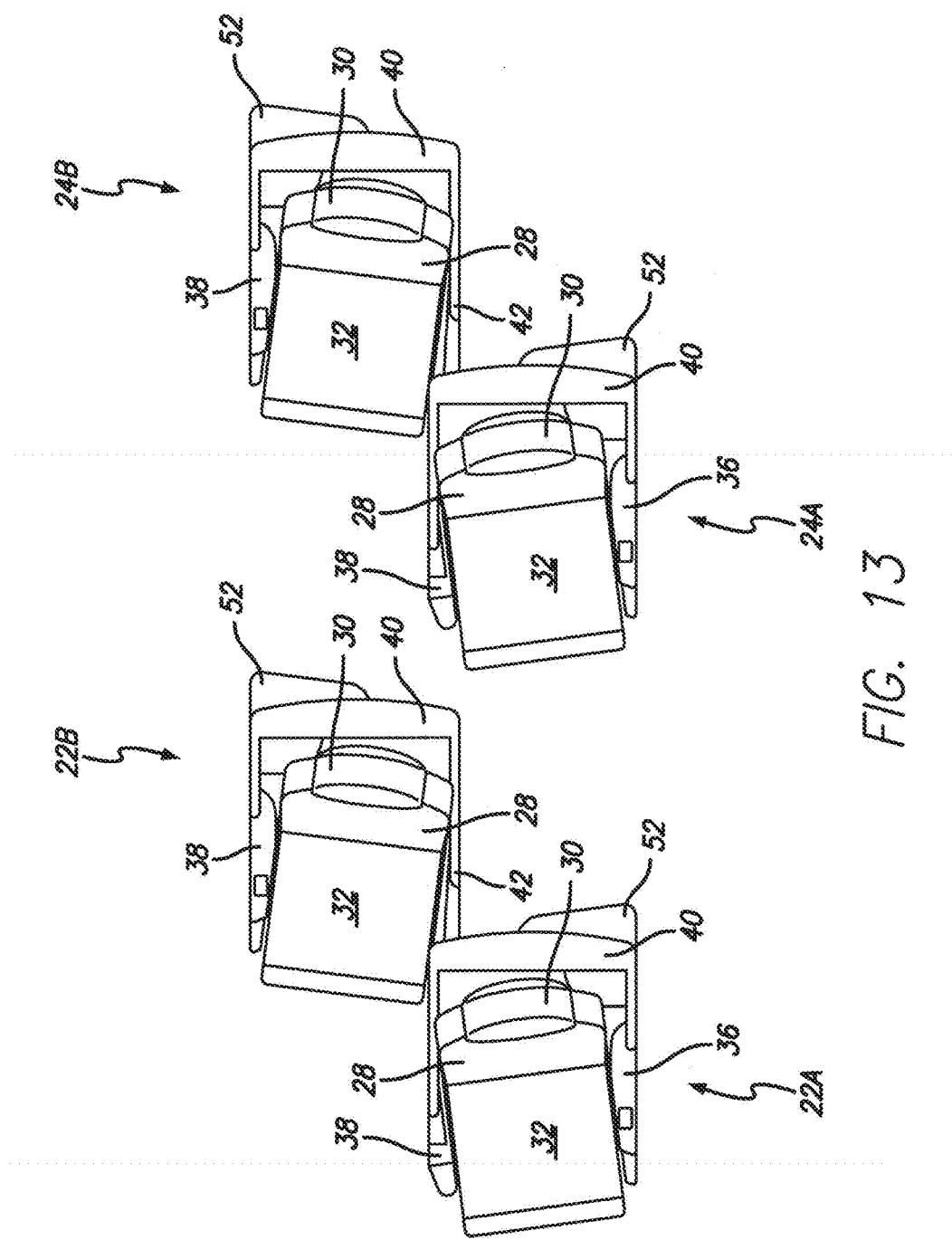
FIG. 13 is a top plan view of two seat groups with each of the seats in the upright position.
Figure 14:
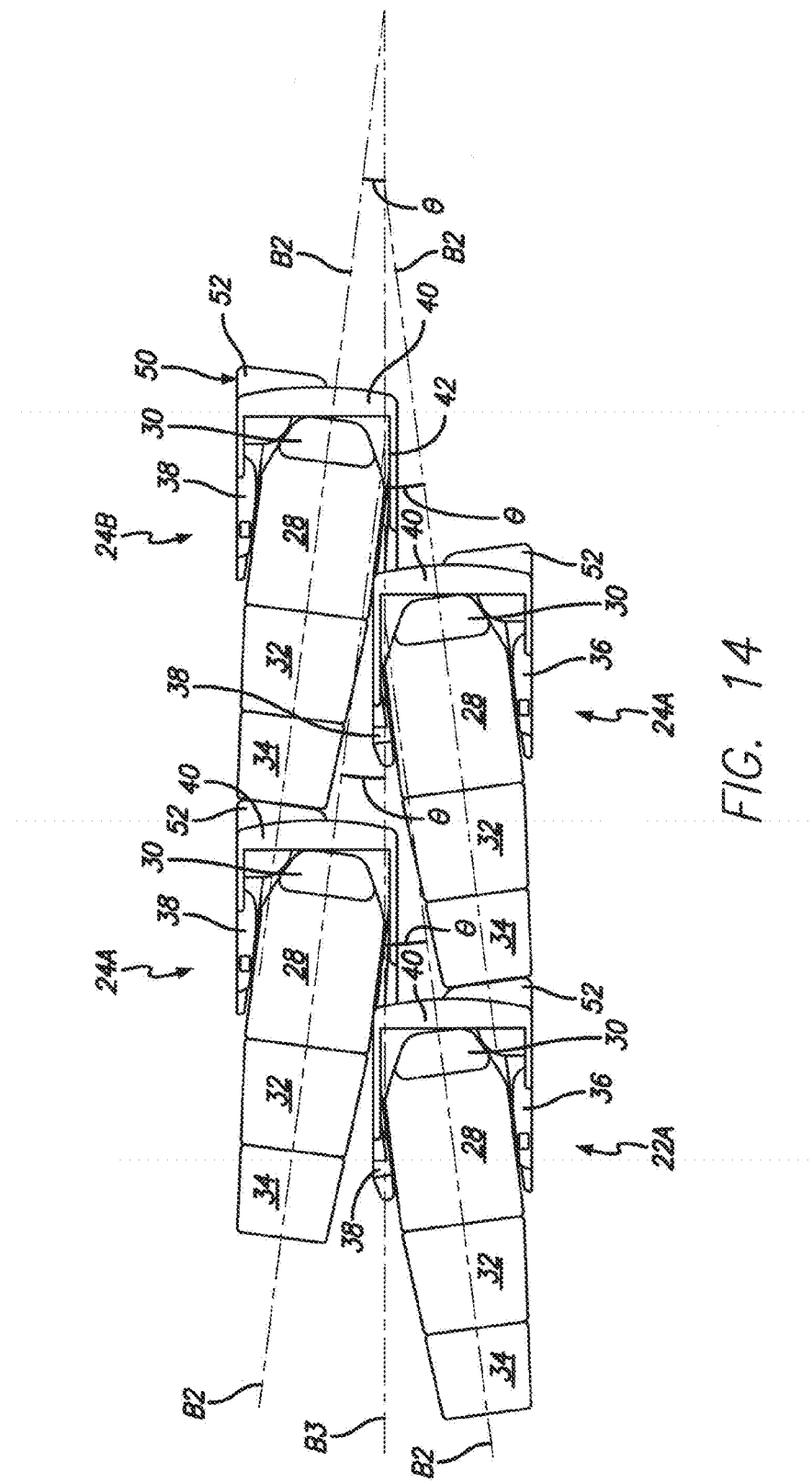
FIG. 14 is a top plan view of the two seat groups of FIG. 13 with each of the seats in the fully reclined position.

It should be understood that although the description herein has used seats on the port side of the aircraft as examples, as is best shown in FIGS. 1 and 11, seats on the starboard side of the aircraft are essentially a mirror image of the seats on the port side of the aircraft. This will apply to many possible configurations. This is not the case for all configurations. For example, the configuration in FIGS. 2 and 12 does not include a mirror image of the "C" seats, since the "F" seats are omitted. However, the "H" and "G" seats are mirror images of the "A" and "B" seats.

It will be understood that the seat groupings in the forwardmost areas of the cabin have separate modules that provide the viewing monitor, tray table, foot space, and similar amenities. For example, for the front seat groupings, the monitor or tray table may be positioned in the arm rest or on the bulkhead.

The particular arrangement shown in the figures and described herein is intended to be only one example of a seating arrangement or configuration incorporating the principles of the invention. As noted above, in other seating configurations, individual seats with aisles or other spacing between each seat may contain the same features as described above, and may be angled as described with reference to the longitudinal axis of the invention, or may be positioned at a different angle. Similarly, seat groupings may contain only one seat or three or more individual seats, and the number and relative spacing and position of the arrays may be varied to suit the available space and cabin configuration. Some arrays may contain a different number of seats than other arrays. In general, a number of different specific cabin arrangements are possible while incorporating the angled and offset configurations described above, and that these configurations are equally applicable to other types of vehicles besides aircraft.

An improved aircraft passenger seat and seating arrangement is described above. Various details of the invention may be changed without departing from the scope of the invention. Furthermore, the foregoing description of the preferred embodiment of the invention and best mode for practicing the invention are provided for the purpose of illustration only and not for the purpose of limitation, the invention being defined by the claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further any specific numbers noted herein are only examples: alternative implementations may employ differing values or ranges.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A passenger seating arrangement for an aircraft cabin, the passenger seating arrangement comprising:
   a first column not positioned adjacent an aisle, the first column comprising a plurality of first seats, each of the plurality of first seats having a first seat back and a first seat bottom and defining a first longitudinal axis; and
   a second column positioned adjacent an aisle and the first column, the second column comprising a plurality of second seats, each of the plurality of second seats having a second seat back and a second seat bottom and defining a second longitudinal axis;
   wherein the first column and the second column each comprise a third longitudinal axis that is approximately parallel with a longitudinal axis of the aircraft cabin;
   wherein each of the plurality of first seats is positioned such that the first longitudinal axis forms an angle with the third longitudinal axis that is between about 1° and about 44°;
   wherein each of the plurality of second seats is positioned such that the second longitudinal axis forms an angle with the third longitudinal axis that is between about 1° and about 44°;
   wherein each of the plurality of second seats is movable between a non-reclined position and a fully reclined position;
   wherein each of the plurality of first seats has aisle access through a space defined between two of the plurality of second seats when the second seat facing the space is in the non-reclined position; and
   wherein each of the plurality of first seats has aisle access by stepping over a leg rest when the second seat facing the space is in the fully reclined position.

2. The passenger seating arrangement of claim 1, wherein the first column and the second column are not separated by an aisle.

3. The passenger seating arrangement of claim 1, wherein the each of the plurality of first seats is longitudinally offset from each of the plurality of second seats.

4. The passenger seating arrangement of claim 1, wherein each of the plurality of first seats is at least partially surrounded by a first privacy shell, and wherein each of the plurality of second seats is at least partially surrounded by a second privacy shell.

5. The passenger seating arrangement of claim 4, wherein the first privacy shell includes a first console portion having an exterior surface and an interior surface, and the second privacy shell includes a second console portion having an exterior surface and an interior surface, wherein the first console portion includes at least one passenger component located on the exterior surface thereof, and wherein the second console portion includes at least one passenger component located on the exterior surface thereof.

6. The passenger seating arrangement of claim 5, wherein the at least one passenger component of the first console portion comprises a tray table, and wherein the at least one passenger component of the second console portion comprises a tray table.

7. The passenger seating arrangement of claim 1, wherein each seat includes a privacy shell that includes at least one passenger component, wherein the at least one passenger component of each privacy shell in the first column is adapted to be used by a passenger in a seat in the second column, and wherein the at least one passenger component of each privacy shell in the second column is adapted to be used by a passenger in a seat in the first column.

8. A passenger seating arrangement for an aircraft cabin, the passenger seating arrangement comprising:
   first and second adjacent columns, the first column comprising at least one first seat, and the second column comprising at least two second seats, the first and second columns defining a first longitudinally extending center axis that extends approximately parallel to a longitudinal axis of the aircraft cabin;
   wherein the at least one first seat in the first column is not positioned adjacent an aisle and faces away from and forms an angle with the first axis of between about 1° and about 44°;
   wherein the at least two second seats in the second column are positioned adjacent an aisle and face away from and form an angle with the first axis of between about 1° and about 44°;
   wherein the at least one first seat in the first column is longitudinally offset from the at least two second seats in the second column;
   wherein each of the at least two second seats are movable between a non-reclined position and a fully reclined position;
   wherein the at least one first seat in the first column has aisle access through a space defined between the at least two second seats when the second seat facing the space is in the non-reclined position; and
   wherein the at least one first seat in the first column has aisle access by stepping over a leg rest when the second seat facing the space is in the fully reclined position.

9. The passenger seating arrangement of claim 8, wherein the at least one first seat is longitudinally offset from the at least two second seats.

10. The passenger seating arrangement of claim 8, wherein the at least one first seat is at least partially surrounded by a first privacy shell, and wherein at least one of the at least two second seats is at least partially surrounded by a second privacy shell.

11. The passenger seating arrangement of claim 10, wherein the first privacy shell includes a first console portion having an exterior surface and an interior surface, and the second privacy shell includes a second console portion having an exterior surface and an interior surface, wherein the first console portion includes at least one passenger component located on the exterior surface thereof, and wherein the second console portion includes at least one passenger component located on the exterior surface thereof.

12. The passenger seating arrangement of claim 11, wherein the at least one passenger component of the first console portion comprises a tray table, and wherein the at least one passenger component of the second console portion comprises a tray table.

13. The passenger seating arrangement of claim 8, wherein each seat includes a privacy shell that includes at least one passenger component, wherein the at least one passenger component of each privacy shell in the first column is adapted to be used by a passenger in a seat in the second column, and wherein the at least one passenger component of each privacy shell in the second column is adapted to be used by a passenger in a seat in the first column.

14. A passenger seating arrangement for an aircraft cabin, the passenger seating arrangement comprising:

a first column not positioned adjacent an aisle, the first column comprising a plurality of first seats, each first seat having a first seat back and a first seat bottom; and a second column positioned adjacent an aisle and the first column, the second column comprising a plurality of second seats, each second seat having a second seat back and a second seat bottom;

wherein the first column and the second column each comprise a longitudinal axis that is approximately parallel with a central longitudinal axis of the aircraft cabin;

wherein each of the plurality of first seats is positioned to face away from and form an angle with the longitudinal axis that is between about 1° and about 44°;

wherein each of the plurality of second seats is positioned to face away from and form an angle with the longitudinal axis that is between about 1° and about 44°;

wherein each of the plurality of second seats is movable between a non-reclined position and a fully reclined position;

wherein each of the plurality of first seats has aisle access through a space is defined between two of the plurality of second seats when the second seat facing the space is in the non-reclined position; and wherein each of the plurality of first seats has aisle access by stepping over a leg rest when the second seat facing the space is in the fully reclined position.

15. The passenger seating arrangement of claim 14, wherein the first column and the second column are not separated by an aisle.

16. The passenger seating arrangement of claim 14, wherein the each of the plurality of first seats is longitudinally offset from each of the plurality of second seats.

17. The passenger seating arrangement of claim 14, wherein each of the plurality of first seats is at least partially surrounded by a first privacy shell, and wherein each of the plurality of second seats is at least partially surrounded by a second privacy shell.

18. The passenger seating arrangement of claim 14, wherein the first privacy shell includes a first console portion having an exterior surface and an interior surface, and the second privacy shell includes a second console portion having an exterior surface and an interior surface, wherein the first console portion includes at least one passenger component located on the exterior surface thereof, and wherein the second console portion includes at least one passenger component located on the exterior surface thereof.

19. The passenger seating arrangement of claim 18, wherein the at least one passenger component of the first console portion comprises a tray table, and wherein the at least one passenger component of the second console portion comprises a tray table.

20. The passenger seating arrangement of claim 14, wherein each seat includes a privacy shell that includes at least one passenger component, wherein the at least one passenger component of each privacy shell in the first column is adapted to be used by a passenger in a seat in the second column, and wherein the at least one passenger component of each privacy shell in the second column is adapted to be used by a passenger in a seat in the first column.

* * * * *